US009323570B2

(12) United States Patent
Ashihara et al.

(10) Patent No.: US 9,323,570 B2
(45) Date of Patent: Apr. 26, 2016

(54) COMPUTER SYSTEM AND MIGRATION METHOD OF VIRTUAL MACHINE

(75) Inventors: Koji Ashihara, Tokyo (JP); Junichi Yamato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 13/498,581

(22) PCT Filed: Sep. 22, 2010

(86) PCT No.: PCT/JP2010/066444
§ 371 (c)(1),
(2), (4) Date: Mar. 27, 2012

(87) PCT Pub. No.: WO2011/037148
PCT Pub. Date: Mar. 31, 2011

(65) Prior Publication Data
US 2012/0185856 A1 Jul. 19, 2012

(30) Foreign Application Priority Data

Sep. 28, 2009 (JP) .................... 2009-222857

(51) Int. Cl.
*G06F 15/16* (2006.01)
*G06F 9/455* (2006.01)
*G06F 9/48* (2006.01)

(52) U.S. Cl.
CPC .......... *G06F 9/4856* (2013.01); *G06F 9/45558* (2013.01); *G06F 2009/4557* (2013.01)

(58) Field of Classification Search
CPC .............. G06F 9/4856; G06F 9/45558; G06F 2009/4557
USPC ......................................... 709/226
See application file for complete search history.

(56) References Cited

U.S. PATENT DOCUMENTS 7,478,173 B1 * 1/2009 Delco ...................... 709/250
8,032,730 B2 * 10/2011 Hara ..................... G06F 3/0607
711/162

(Continued)

FOREIGN PATENT DOCUMENTS

| CN | 101101562 A | 1/2008 |
| JP | 2004-078465 A | 3/2004 |
| JP | 2009-146106 A | 7/2009 |
| WO | WO2005/083569 A1 | 9/2005 |
| WO | WO 2008/062864 A1 | 5/2008 |

OTHER PUBLICATIONS

Japanese Office Action dated Apr. 16, 2013 and partial English translation thereof.

(Continued)

*Primary Examiner* — Kevin Bates
*Assistant Examiner* — Nazia Naoreen
(74) *Attorney, Agent, or Firm* — McGinn IP Law Group, PLLC.

(57) ABSTRACT

A computer system of the present invention is provided with an open flow controller 3, and a switch 4i. The switch 4i notifies a MAC address contained in packet data to the open flow controller 3 when the packet data from the virtual machine that the migration has completed does not fit with a rule shown by the flow set to the switch itself. The open flow controller 3 sets a communication flow for a migration destination VM generated according to the notified MAC address to the switch 4i. The switch 4i transfers the packet data for said virtual machine which follows a rule 444 shown by the communication flow for said migration destination VM, to the migration destination virtual machine based on an action 445 shown by the communication flow for said migration destination VM.

20 Claims, 15 Drawing Sheets

(56) References Cited

U.S. PATENT DOCUMENTS

| | | | |
|---|---|---|---|
| 8,074,262 B2* | 12/2011 | Scarlata | G06F 21/53 726/4 |
| 8,385,202 B2* | 2/2013 | Kuik et al. | 370/235 |
| 2004/0111511 A1 | 6/2004 | Maeda et al. | |
| 2006/0200819 A1* | 9/2006 | Cherkasova | G06F 9/45533 718/1 |
| 2008/0019316 A1 | 1/2008 | Imai | |
| 2008/0077706 A1 | 3/2008 | Maeda et al. | |
| 2008/0189769 A1* | 8/2008 | Casado et al. | 726/4 |
| 2009/0138752 A1 | 5/2009 | Graham et al. | |
| 2009/0157846 A1 | 6/2009 | Shimozono et al. | |
| 2012/0060010 A1 | 3/2012 | Shimozono | |

OTHER PUBLICATIONS

Fang Hao, et al.,"Enhancing dynamic cloud-based services using network virtualization", Proceedings of the 1st ACM workshop on Virtualized infrastructure systems and architectures, USA, ACM, Aug. 17, 2009, p. 37-44 (URL http://conferences.sigcomm.org/sigcomm/2009/workshops/visa/papers/p37.pdf).

International Search Report in PCT/JP2010/066444 dated Dec. 7, 2010 (English Translation Thereof).

Akio Iijima, et al., "Sentan Kankyo Gijutsu Cloud Computing Jidai no Data Center to Network no Energy Saving Gijtsu", NEC Technical Journal, Sep. 25, 2009, vol. 62, No. 3, pp. 117-120, entire text, all drawings.

Toshikazu Watanabe, "Part 3 Network no Kasoka Data Center 3.0/ UCS Cisco", Data Center Kanzen Guide, Jul. 1, 2009, 2009 Nen Summer Issue, p. 82.

"OpenFlow Switch Specification Version 0.9.0 (Wire Protocol 0x98)"[online], Jul. 20, 2009, [retrieval] date Nov. 24, 2010 Internet URL:http://www.openflowswitch.org/documents/openflow-spec-v0.9.0.pdf, entire text, all drawings.

Chinese Office Action dated May 5, 2014 with an English translation.

European Extended Search Report dated Feb. 4, 2014.

* cited by examiner

Fig. 9

| Port/λ/VC/Wireless | (L2) MAC DESTINATION ADDRESS | (L2) MAC SOURCE ADDRESS | VLAN TAG | (L3) IP DESTINATION ADDRESS | (L3) IP SOURCE ADDRESS | (L4) DESTINATION PORT NO. | (L4) SOURCE PORT NO. | DATA |

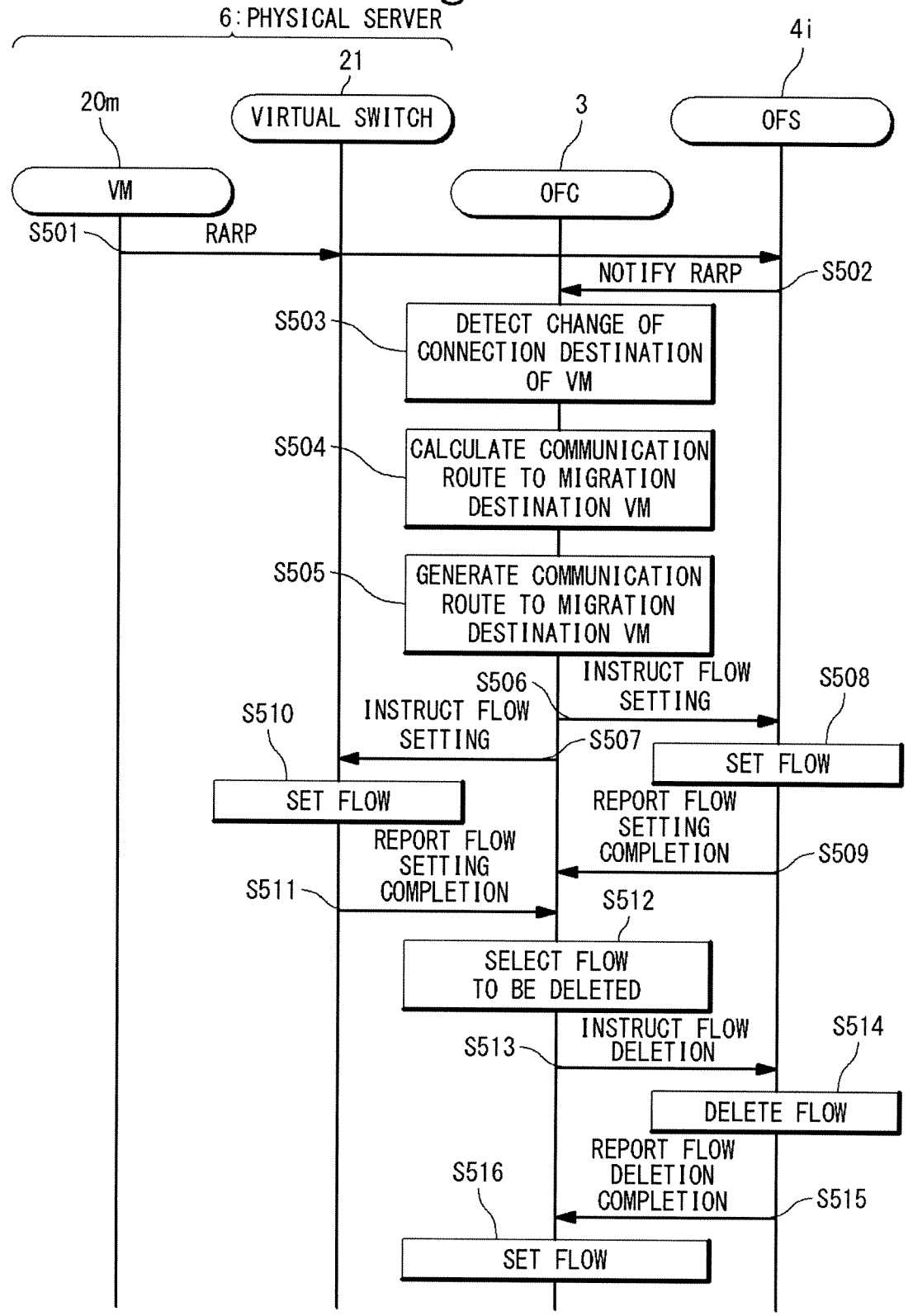

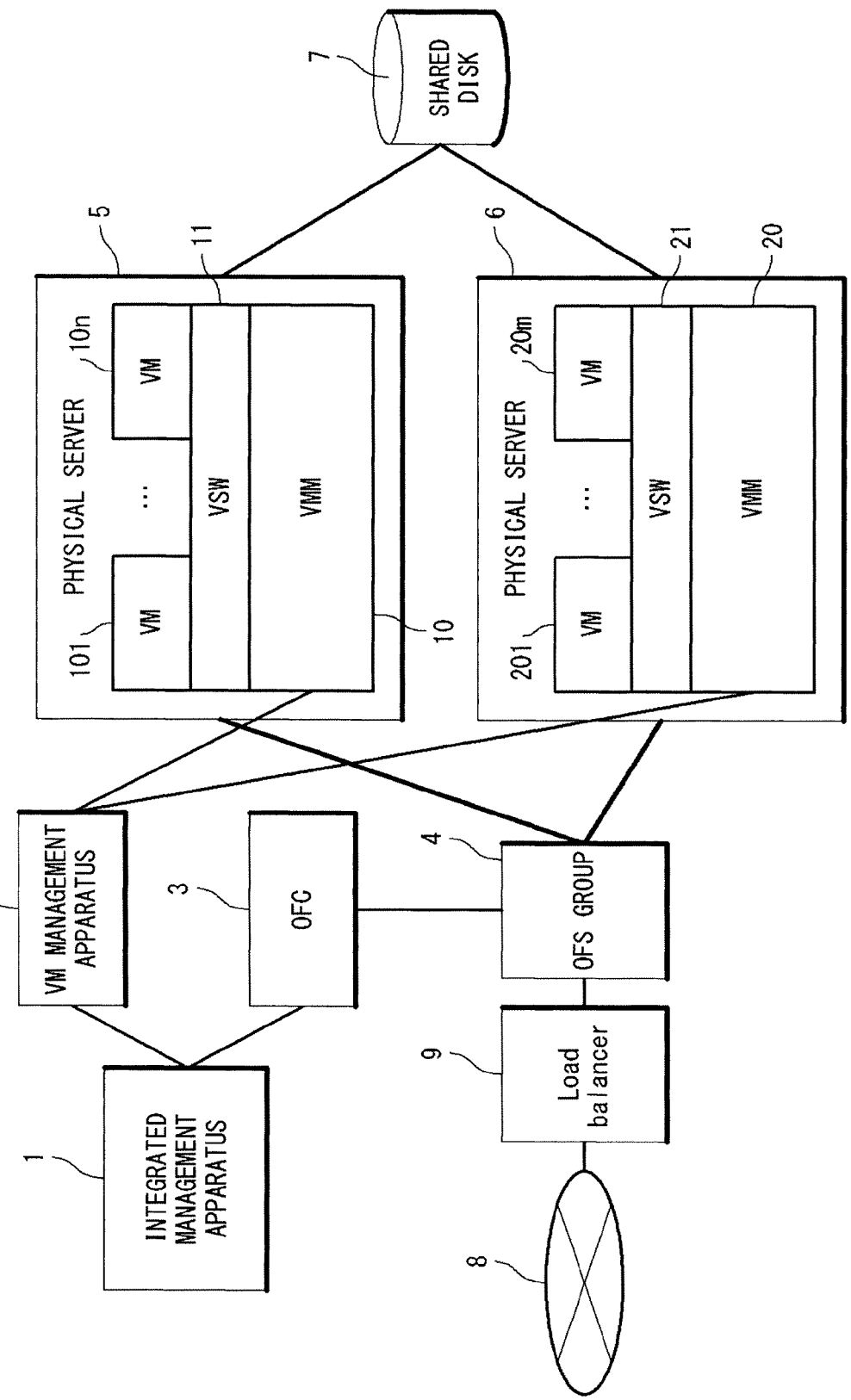

COMPUTER SYSTEM AND MIGRATION METHOD OF VIRTUAL MACHINE

TECHNICAL FIELD

The present invention is related to a computer system and a migration method of a virtual machine, and more particularly, to a computer system in which a migration of a virtual machine is possible while carrying out integrated management of a network environment and an IT environment.

BACKGROUND ART

In recent years, a more flexible system configuration became possible by a plurality of virtual machines operating on one physical server. In such a system, a system load distribution, a failure avoidance and so on can be realized by a migration technique in which an operating virtual machine is migrated to another physical server and a memory area without stopping the operating virtual machine.

As a technique of the migration, for example, WO 2005/083569 (Patent Literature 1), JP 2009-146106A (Patent Literature 2), JP 2004-78465A (Patent Literature 3) are known.

Patent Literature 1 discloses a network system which is provided with a switching controller of an operating server and a connection controller which switches a connection destination to a switching destination target network which contains a backup server from a target network which contains a main server. In such a configuration, a system disclosed in Patent Literature 1 is possible to carry out a process migration without the service stop to a user and the re-setting of a communication.

Patent Literature 2 discloses a storage system in which an access route to an identical storage is changed by switching a physical port as an addition destination of a virtual port to another physical port and updating a routing table of a switch unit based on identification data of a physical port of a switching destination.

Patent Literature 3 discloses a technique in which a rundown time of a migration object process in process migration processing is reduced.

In a computer system in which a plurality of computers are connected through a network, generally, a network manager who manages the network and an IT (information technology) manager who manages the computers are required individually. The IT manager carries out the migration of a virtual machine in consideration of a load on the side of the computer (for example, a usage rate of a CPU and a memory) but in no consideration of the load on the side of the network. When migrating a memory image of the virtual machine, there is a case that the transmission of data is carried out through the network. During this period, access to the virtual machine continues in no consideration of the migration of the memory image on the side of the network. Therefore, there is a fear that the traffic which occurs with the migration of the virtual machine obstructs communication with a migration object virtual machine and another virtual machine.

CITATION LIST

[Patent Literature 1] WO 2005/083569
[Patent Literature 2] JP 2009-146106A
[Patent Literature 3] JP 2004-78465A

SUMMARY OF THE INVENTION

In this way, because the computer system is managed separately on the side of the network and on the side of the IT, the setting for the migration of the virtual machine is individually carried out on the side of the network and the side of the IT. However, in order to execute the migration of the virtual machine in consideration of influence on both of the side of the network and the side of the IT (computer), it is desirable to carry out integrated management of both of the side of the network and the side of the IT.

One object of the present invention is to provide a computer system which a migration of a virtual machine can be carried out by integratedly controlling both of the side of the network and the side of the computer.

In order to attain the above-mentioned object, the present invention uses the schemes described below.

The computer system of the present invention is provided with a VM management apparatus, an open flow controller, and a switch. The VM management apparatus is configured to instruct migration of a virtual machine operating on a physical server to a virtual machine monitor which manages the virtual machine and a migration destination virtual machine monitor. The switch notifies a MAC address contained in packet data to the open flow controller when the packet data from the virtual machine that the migration has completed does not fit with a rule shown by the flow set to the switch itself. The open flow controller sets a communication flow for a migration destination VM generated according to the notified MAC address to the switch. The switch transfers the packet data for the virtual machine which follows a rule shown by the communication flow for the migration destination VM, to the migration destination virtual machine based on an action shown by the communication flow for the migration destination VM.

The migration method of the virtual machine of the present invention includes a VM management apparatus instructing a migration of a virtual machine operating on a physical server to a virtual machine monitor which manages the virtual machine and a virtual machine monitor of the migration destination; notifying a MAC address of packet data to an open flow controller when the packet data received from the virtual machine which completed a migration does not fit with a rule shown by a flow set to the switch; an open flow controller setting a communication flow for a migration destination VM which is generated according to the notified MAC address to the switch; and the switch transferring the packet data for the virtual machine which follows the rule shown by the communication flow for the migration destination VM to a migration destination virtual machine according to an action shown by the communication flow for the migration destination VM.

As mentioned above, according to the present invention, the communication with the migration object virtual machine can be switched to the migration destination virtual machine by setting a flow according to the MAC address of the received first packet to the switch. The transfer of the memory image of the virtual machine and the communication with the migration destination virtual machine can be switched by setting the migration destination of the virtual machine to the VM management apparatus at least. Also, in the present invention, because the switching of the destination of the switch is carried out by the flow which is set by the open flow controller, the period of the stop of the virtual machine can be reduced when viewing from the side of the network in accompaniment with the migration of the virtual machine.

According to the present invention, the migration of the virtual machine can be executed by integratedly controlling the side of the network and the side of the computer like source.

Also, the packet loss in the live migration of the virtual machine can be reduced.

BRIEF DESCRIPTION OF THE DRAWINGS

The purposes, effects, characteristics of the invention would become clearer from the description in exemplary embodiments in cooperation with the attached drawings:

FIG. 9 is a diagram showing the open flow control according to the present invention;

FIG. 16 is a sequence diagram showing access destination changing processing in the migration processing by the virtual machine the third exemplary embodiment; and FIG. 17 is a diagram showing a configuration of the computer system according to a fourth exemplary embodiment of the present invention.

DESCRIPTION OF THE EXEMPLARY EMBODIMENTS

Figure 1:
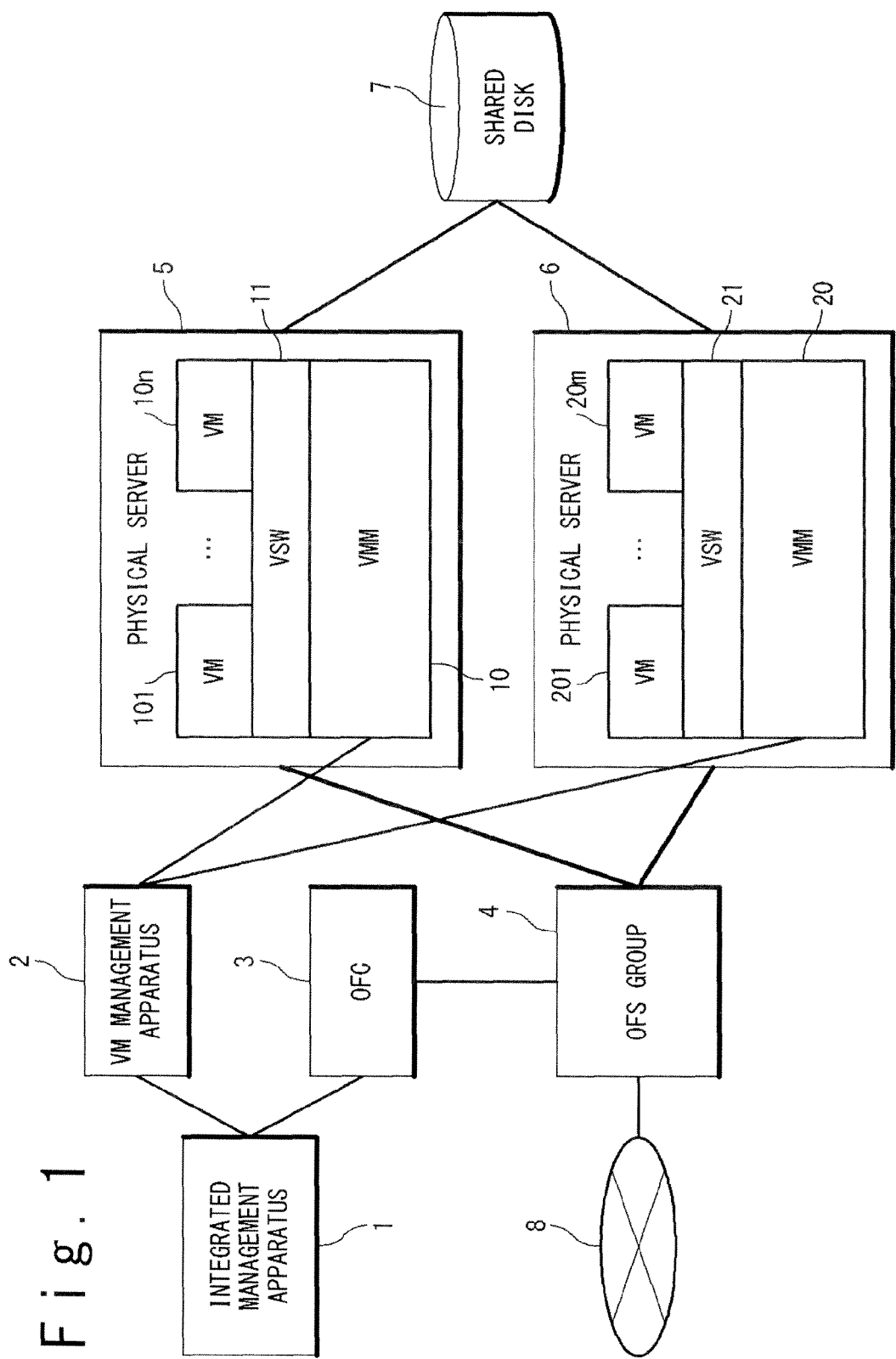
FIG. 1 is a diagram showing a configuration of a computer system according to a first and second exemplary embodiments of the present invention.

Hereinafter, exemplary embodiments of the present invention will be described with reference to the attached drawings. In the drawings, the same and similar reference numerals denote same and similar components.

First Exemplary Embodiment (Configuration of Computer System)

A configuration of a computer system according to a first exemplary embodiment of the present invention will be described with reference to FIG. 1 to FIG. 9. FIG. 1 is a block diagram showing the configuration of the computer system according to first and second exemplary embodiments of the present invention. The computer system of the present invention is provided with an integrated management apparatus 1, a virtual machine management apparatus 2 (hereinafter, to be referred to as a VM management apparatus 2), an open flow controller 3 (hereinafter, to be referred to as an OFC 3), a switch group 4 (hereinafter, to be referred to as an open flow switch (OFS) group 4), physical servers 5 and 6, a storage unit 7 such as a shared disk.

The physical servers 5 and 6 are mutually connected through the OFS group 4 which has at least one open flow switch. Also, the physical servers 5 and 6 are connected with an external network 8 such as the Internet through the OFS group 4. It should be noted that in the present exemplary embodiment, the two physical servers 5 and 6 are illustrated but the number of the physical servers is not limited to 2.

The physical servers 5 and 6 are computers, each of which is provided with a CPU and a RAM, and executes a program stored in common to the physical servers 5 and 6 or separately from each other in the storage unit 7. Thus, at least one virtual machine is realized. In detail, the physical server 5 is provided with virtual machines 101 to 10$n$ (n is a natural number) which are realized by logically or physically dividing the CPU (not shown) and the use area of the storage unit 7. Or, the virtual machines 101 to 10$n$ may be realized by use of a software program which operates on a guest operation system (GOS) or a software program operating on the GOS which is emulated on a host operation system (HOS). The virtual machines 101 to 10$n$ are managed by a virtual machine monitor 10 (hereinafter, to be referred to as a VMM 10) which is realized by executing a program which is stored in the storage unit 7 by the CPU (not shown). The physical server 6 is provided with at least one of virtual machines 201 to 20$m$ (m is a natural number), which are managed by a VMM 20, like the physical server 5.

It is desired that a disk image (a memory image) used by the virtual machines 101 to 10$n$ and 201 to 20$m$ is stored in the shared disk. For example, the shared disk is illustrated by a disk array, NAS (Network Attached Storage), a database server and so on which is connected by FC (Fiber Channel) and Ether (registered trademark) network.

A method of managing the virtual machines 101 to 10$n$ by the VMM 10 and a method of managing the virtual machines 201 to 20$m$ by the VMM 20 are same as the conventional art. For example, the VMM 10 manages a memory image used by the virtual machines 101 to 10$n$ and the VMM 20 manages a memory image used by the virtual machines 201 to 20$m$.

Each of the virtual machines 101 to 10$n$ transmits and receives data to and from another unit (for example, a computer on an external network 8 or a virtual machine on another physical server 6) through a physical NIC (not shown) and the virtual switch 11 which is managed by the VMM 10. In the present exemplary embodiment, a packet transmission is carried out based on TCP/IP (Transmission Control Protocol/Internet Protocol) as an example. In the same way, each of the virtual machines 201 to 20$m$ transmits and receives data to and from another unit through the virtual switch 21. Also, the communication between the virtual machines in the identical physical server is carried out through the virtual switch 11 or 21.

It is supposed that the MAC address does not change even if the virtual machines 101 to 10$n$ and 201 to 20$m$ according to the present invention migrate to a different VMM or physical server. Also, the virtual switches 11 and 21 may be controlled by an open flow technique to be described later, and may carry out a switching operation (layer 2) as in the conventional technique. An example that the virtual switches 11 and 21 in the following exemplary embodiments deal with the open flow technique will be described. Moreover, a bridge connection is carried out in the virtual machines 101 to 10$n$, and 201 to 20*m* and an external unit of the physical server. That is, the communication can be carried out directly externally by use of MAC addresses and IP addresses of the virtual machines 101 to 10*n*, and 201 to 20*m*.

Figure 2:
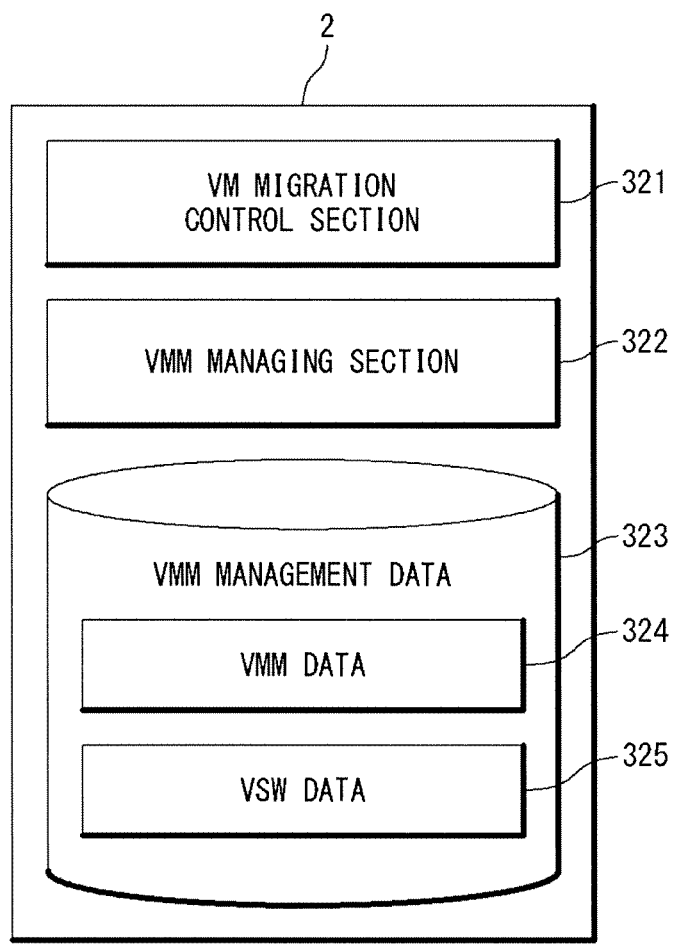
FIG. 2 is a diagram showing the configuration of a VM management apparatus of the present invention.

The VM management apparatus 2 manages the virtual machines 101 to 10*n* and 201 to 20*m* operating on the physical servers 5 and 6. FIG. 2 is a diagram showing the configuration of the VM management apparatus 1 of the present invention. It is desirable that the VM management apparatus 2 is realized by a computer which is provided with a CPU and a storage unit. In the VM management apparatus 2, by the CPU (not shown) executing a program stored in the storage unit, functions of a VM migration control section 321 and a VMM management section 322 which are shown in FIG. 2 are realized.

The VM migration control section 321 controls the migration of the virtual machines. In detail, the VM migration control section 321 specifies one virtual machine as a migration target and one virtual machine monitor as a migration destination based on VMM management data 323 stored in a storage unit, and instructs the migration of the virtual machine to the virtual machine monitors as a migration source and the migration destination. Thus, the migration of the virtual machine is carried out between the instructed virtual machine monitors.

The VMM managing section 322 manages the data (VMM management data 323) of the virtual machine monitors and the virtual switches under the management. The VMM management data 323 contains data of an identifier of each of the virtual machine monitors and of the virtual machines managed by the virtual machine monitor (i.e. VMM data 324), and data (VSW data 325) of an identifier of a virtual switch and of the virtual machines connected with the virtual switch. It is desirable that the VMM data 324 and the VSW data 325 are related to each other every virtual machine monitor which manages the virtual switch.

The VMM management data 323 may be stored in the storage unit in advance and may be acquired at an optional time or periodically from the VMMs 10 and 20. When acquiring the VMM management data 323 from the VMMs 10 and 20, it is desirable that the VMM management data 323 is acquired from the VMM 10 and 20 in response to an instruction from the VMM managing section 322, and the VMM management data 323 in the storage unit is updated based on the acquired data. Thus, it becomes possible to monitor the changed connection destination of the virtual switch and the changed migration destination of the virtual machine after the migration of the virtual machine.

The OFC 3 controls communication in the system by the open flow technique. In the open flow technique, a controller (OFC 3 in this example) sets route data of a multi-layer unit in a flow unit to the switch according to a routing policy (flow: rule+action) so as to carry out a route control and a node control. In this way, a route control function is separated from a router and a switch, and the optimal routing and the traffic control become possible through the centralized control by the controller. The switches (OFS group 4) to which the open flow technique is applied deal with communication as a flow of END-to-END which is not in units of packets and frames in the conventional router and switch.

In detail, the OFC 3 controls the operations (for example, a relay operation of the packet data) of the switch and the node by setting the flow (rule+action) every switch or node. In this example, the switches which are controlled by the OFC 3 are exemplified as the OFS group 4, the virtual switches 11 and 21 and so on. The nodes which are controlled by the OFC 3 are exemplified by the virtual machines 101 to 10*n* and 201 to 20*m*, the VMMs 10 and 20, the physical server 5 and 6, the storage unit 7 and so on.

Figure 3:
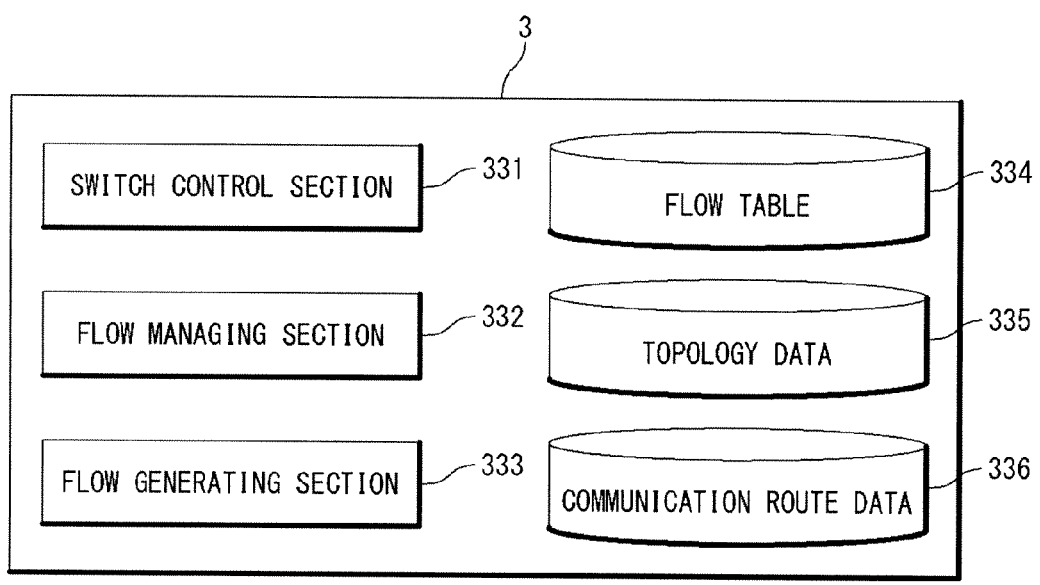
FIG. 3 is a diagram showing a configuration of an open flow controller of the present invention.

FIG. 3 is a diagram showing the configuration of the OFC 3 in the present invention. It is desirable that the OFC 3 is realized by a computer which is provided with a CPU and a storage unit. In the OFC 3, the functions of a switch control section 331, a flow managing section 332, a flow generating section 333 shown in FIG. 3 are realized by executing a program which is stored in the storage unit by the CPU (not shown).

Therefore, the switch control section 331 caries out the setting or deletion of the flow (rule+action) every switch or node according to a flow table 334. The switch and node according to the present invention refer to the set flow and execute the action (for example, relaying and discarding of the packet data) corresponding to the rule according to the header data of the reception packet. The details of the rule and the action will be described later.

Figure 4:
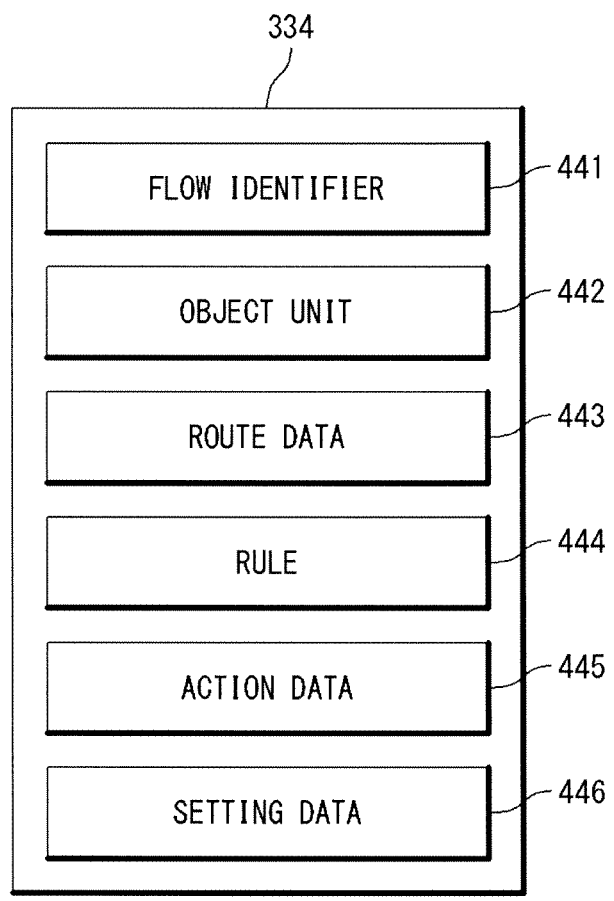
FIG. 4 is a diagram showing a configuration example of a flow table of the open flow controller of the present invention.
Figure 5:
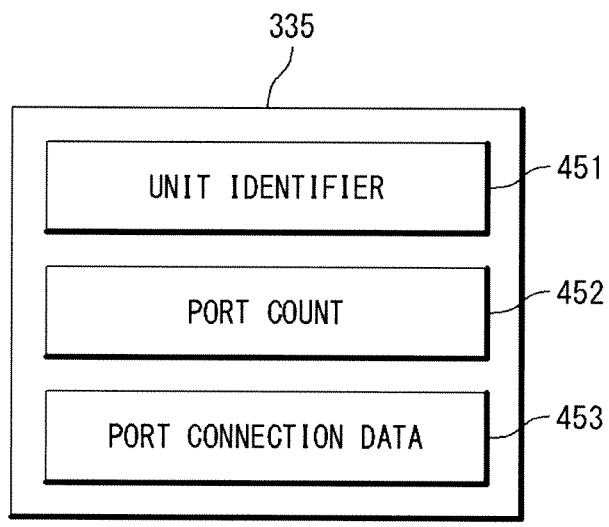
FIG. 5 is a diagram showing an example of topology data of the open flow controller of the present invention.
Figure 6:
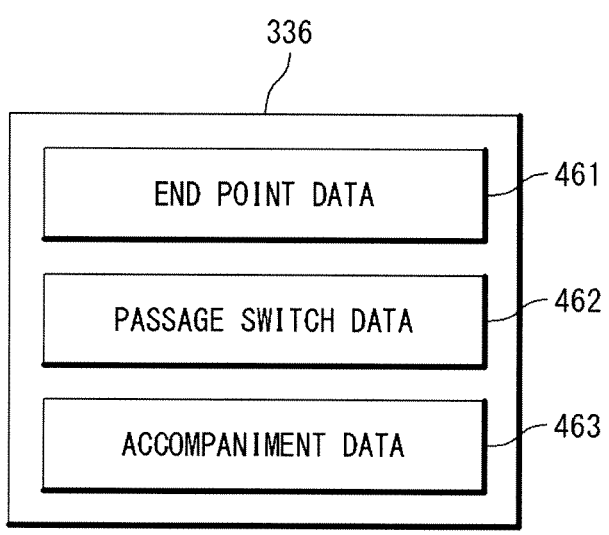
FIG. 6 is a diagram showing an example of communication route data of the open flow controller of the present invention.

FIG. 4 is a diagram showing an example of the configuration of the flow table 334 retained by the OFC 3 of the present invention. Referring to FIG. 4, in the flow table 334, a flow identifier 441 used to specify a flow, an identifier used to identify a set object (switch and node) of the flow (Object unit 442), route data 443, a rule 444, action data 445, and setting data 446 are related to each other and are stored. The flow (rule 444+action data 445) to all the switches and nodes which is a control target of the OFC 3 is set to the flow table 334. In the flow table 334, a method of handling communication such as data of Qos and coding every flow may be defined.

In the rule 444, for example, a combination of the identifier and the addresses of layer 1 to layer 4 in an OSI (Open Systems Interconnection) reference model is defined and is contained in the header data of packet data in TCP/IP protocol. For example, a combination of a physical port of the layer 1, a MAC address of the layer 2, an IP address of the layer 3, a port number of the layer 4, and the VLAN tag is set as the rule 444, as shown in FIG. 9. Here, a predetermined range of the identifiers and the addresses of the port numbers may be set to the rule 444. Also, it is desirable that the destination address and the source address are identified and set in the rule 444. For example, a range of the MAC destination address, a range of a destination port number which specifies an application of a connection destination, and a range of the source port number which specifies an application of a connection source are set as the rule 444. Moreover, an identifier which specifies a data transfer protocol may be set as the rule 444.

For example, a method of processing TCP/IP packet data is prescribed in action data 445. For example, data showing whether reception packet data should be relayed and a transmission destination in case of the relay are set. Also, a replica of the packet data and data which instructs discarding may be set in the action data 445.

The route data 443 is data used to specify a route to which a flow (rule 444+action data 445) is applied. This is an identifier which is related to a communication path data 336 to be described later.

The setting data 446 contains data ("already set", or "not set") showing whether or not a flow (rule 444+action data 445) has been set to the communication path, the switch and so on at present. Also, it is possible to confirm whether or not a flow has been set to the communication path, and it is possible to confirm whether or not the flow has been set every switch and node on the communication path, because the setting data 446 is related to object unit 442 and the route data

443. Also, the setting data 446 contains data showing whether the generated flow is in a use possible (valid) condition or in a use impossible (invalid) condition. The switch control section 331 refers to the setting data 446 to set only a valid flow to the switch (OFS) and node and does not set an invalid flow.

The flow managing section 332 refers to the flow table 334 to extract the flow (rule 444+action data 445) corresponding to the header data of first packet data notified from the switch and node and notifies it to the switch control section 331. Also, the flow managing section 332 relates the flow identifier 441 to the flow (rule 444+action data 445) generated by the flow generating section 333 and stores them in a storage unit. At this time, the identifier (route data 443) of a communication path to which a flow is applied, and an identifier (object unit 442) of the switch or node to which the flow is applied, is added to the flow (rule 444+action data 445) and stored.

The flow generating section 333 calculates the communication path by using the topology data 335, and stores a calculation result in the storage unit as communication route data 336. In this example, nodes which are endpoints of the communication route, and switches and nodes on the communication route are set. Also, the flow generating section 333 generates the flow (rule 444+action data 445) to be set to the switches and the nodes on the communication route based on the communication route data 336.

The topology data 335 contains data of connection situation of the switches (e.g. the OFS group 4, the virtual switches 11 and 21, and so on), the nodes (e.g. the virtual machines 101 to 10*n* and 201 to 20*m*, the VMMs 10 and 20, the physical servers 5 and 6, and the storage unit 7), and an external network 8 (e.g. the Internet). Specifically, a unit identifier 451 which specifies the switch or node (unit) is related to the number 452 of ports in the unit and the port connection destination data 453, and they are stored in the storage unit as the topology data 335. The port connection destination data 453 contains a connection type (switch/node/external network) which specifies a connection counter end, and data (a switch ID in case of the switch, a MAC address in case of the node, an external network ID in case of the external network) which specifies the destination of the connection.

The communication route data 336 is data used to specify the communication route. In detail, as the communication route data 336, the endpoint data 461 which specifies a group of nodes (e.g. the virtual machines 101 to 10*n* and 201 to 20*m*, the VMMs 10 and 20, the physical server 5 and 6, the storage unit 7 and so on) or an external network interface as the endpoint, passage switch data 462 which specifies passage switches (e.g. the OFS group 4, virtual switches 11 and 21, and so on), and a group of pairs of ports, and accompaniment data 463 are related and are stored in the storage unit. For example, when the communication route connects an external network and a node, the external network ID and the MAC addresses of the node are stored as the endpoint data 461. Or, when the communication route connects between the nodes, a pair of MAC addresses of the nodes as the endpoints is stored as the endpoint data 461. The passage switch data 462 contains the identifier of the switch (the open flow switch and the virtual switch) which is provided onto the communication route between the endpoints shown by the endpoint data 461. Also, the passage switch data 462 may contain data for relating the flow (rule 444+action data 445) set to the switch and the switch. The accompaniment data 463 contains data of the switch (passage switch) on the route after the endpoint is changed.

The flow managing section 332 of the present invention controls the flow generating section 333 in response to a migration instruction (migration preparation instruction) of the virtual machine and generates a flow (memory image transfer flow) for transferring a memory image, and controls the switch control section 331 to set the memory image transfer flow to the OFS and the nodes on the memory image transfer route. Also, the flow managing section 332 of the present invention controls the flow generating section 333 in response to the migration instruction (migration preparation instruction) of the virtual machine to generate a flow (communication flow for the migration destination VM) for access to the virtual machine after the migration, and controls the switch control section 331 to set the communication flow for the migration destination VM to the OFS group and nodes on the communication route for migration destination VM.

Figure 7:
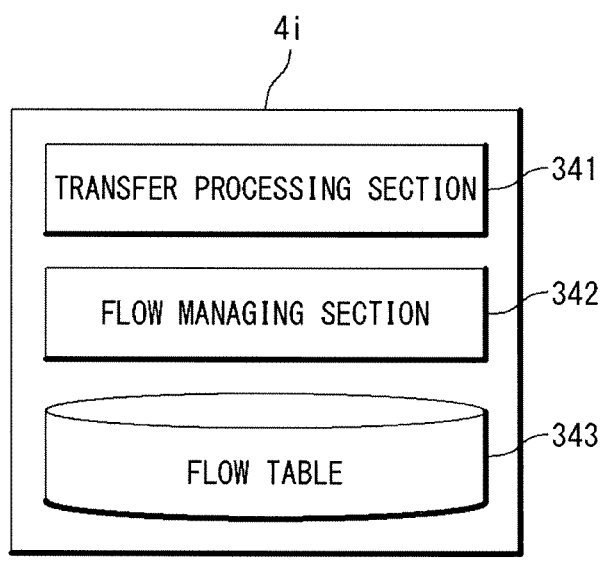
FIG. 7 is a diagram showing the configuration of the open flow switch according to the present invention.

The OFS group 4 is provided with at least one open of the flow switches 41 to 4*i* (i is a natural number). FIG. 7 is a diagram showing the configuration of the open flow switch 4*i* (hereinafter, to be referred to as the OFS 4*i*) according to the present invention. Therefore, the OFS 4*i* determines a processing method (action) of a reception packet according to the flow table 343 set by the OFC 3. The OFS 4*i* is provided with the transfer processing section 341 and the flow managing section 342. The transfer processing section 341 and the flow managing section 342 may be configured in hardware and may be realized by a software program which is executed by the CPU.

Figure 8:
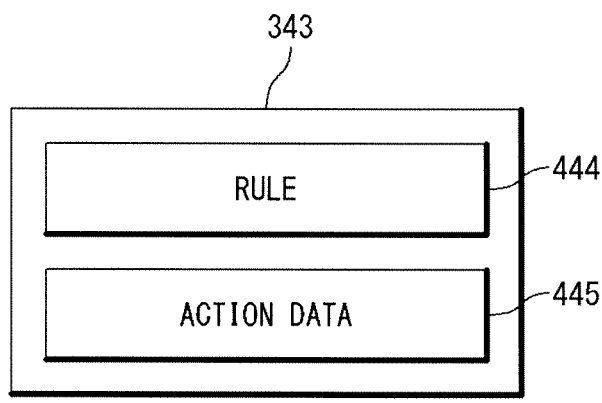
FIG. 8 is a diagram showing an example of a flow table of the switch of the present invention.

A flow table 343 as shown in FIG. 8 is set in the storage unit of the OFS 4*i*. The flow managing section 342 sets a flow (rule 444+action data 445) acquired from the OFC 3 to the flow table 343. Also, when the header data of the reception packet received by the transfer processing section 341 matches to (coincides with) the rule 444 stored in the flow table 343, the flow managing section 342 notifies the action data 445 corresponding to the rule 444 to the transfer processing section 341. On the other hand, when the header data of the reception packet received by the transfer processing section 341 does not match to (coincides with) the rule 444 stored in the flow table 343, the flow managing section 342 notifies the reception of the first packet to the OFC 3 and transmits the header data to the OFC 3.

The transfer processing section 341 carries out the transfer processing according to the header data of the reception packet. In detail, the transfer processing section 341 extracts the header data from the received packet data and notifies it to the flow managing section 342. When receiving the action data 445 from the flow managing section 342, the transfer processing section 341 carries out processing according to the action data 445. For example, the transfer processing section 341 transfers the reception packet data to the destination node shown by the action data 445. Also, when receiving the packet data which has not the rule 444 prescribed in the flow table 343 is received, the transfer processing section 341 retains the packet data during a predetermined period and waits until the flow is set from the OFC 3 (the flow table 343 is updated).

Specifically, an operation of the OFS 4*i* set with a flow in which rule 444: MAC transmission source address (L2) of "A1-A3", IP destination address (L3) of "B1-B3", the protocol of "http", destination port number (L4) of "C1-C3", and the action data 445: "relay to the virtual machine 101 of the physical server 5" are related will be described. When receiving the packet data that has the MAC source address (L2) of "A1", the IP destination address (L3) of "B2", the protocol of "http", and the destination port number (L4) of "C3", the OFS 4*i* determines that the header data matches to the rule 444 and transfers the received packet data to the virtual machine 101. On the other hand, when receiving the packet data that has the MAC transmission source address (L2) of "A5", the IP destination address (L3) of "B2", the protocol of "http", and the destination port number (L4) of "C4", the OFS 4i determines that the header data does not match to the rule 444, and notifies the reception of the first packet to the OFC 3 and transmits the header data to the OFC 3. The OFC 3 extracts the flow (rule 444+the action data 445) corresponding to the received header data from the flow table 334 and transmits it to the OFS 4i. It should be noted that when there is not an appropriate flow in the flow table 334, a flow may be newly generated. The OFS 4i sets the transmitted flow to its own flow table 343 and executes the relay processing of the reception packet according to this.

As mentioned above, the open flow technique (called programmable flow technique) is applied to the computer system of the present invention. It should be noted that in addition to the OFS group 4, the virtual switches 11 and 21 may be provided with the flow table in which a flow is set by the OFC 3, like the OFS 4i. In this case, the OFC 3 can control the operation of the virtual switches 11 and 21, like the OFS group 4.

The computer system in the first exemplary embodiment is provided with the integrated management apparatus 1 which controls the VM management apparatus 2 and the OFC 3. It is desirable that the integrated management apparatus 1 is realized by the computer which is provided with a CPU and a storage unit. The integrated management apparatus 1 is desirable to have an input unit (exemplified as a keyboard and a mouse) and a display unit (exemplified as a monitor, and a printer) which visibly displays various types of data transmitted from the VM management apparatus 2 or the OFC 3. A user (manager) controls the VM management apparatus 2 and the OFC 3 by using the integrated management apparatus 1 and executes the migration of the virtual machines.

Each of the integrated management apparatus 1, the VM management apparatus 2 and the OFC 3 may be provided in a same computer or respectively in different computers.

(Migration of Virtual Machine)

Figure 10:
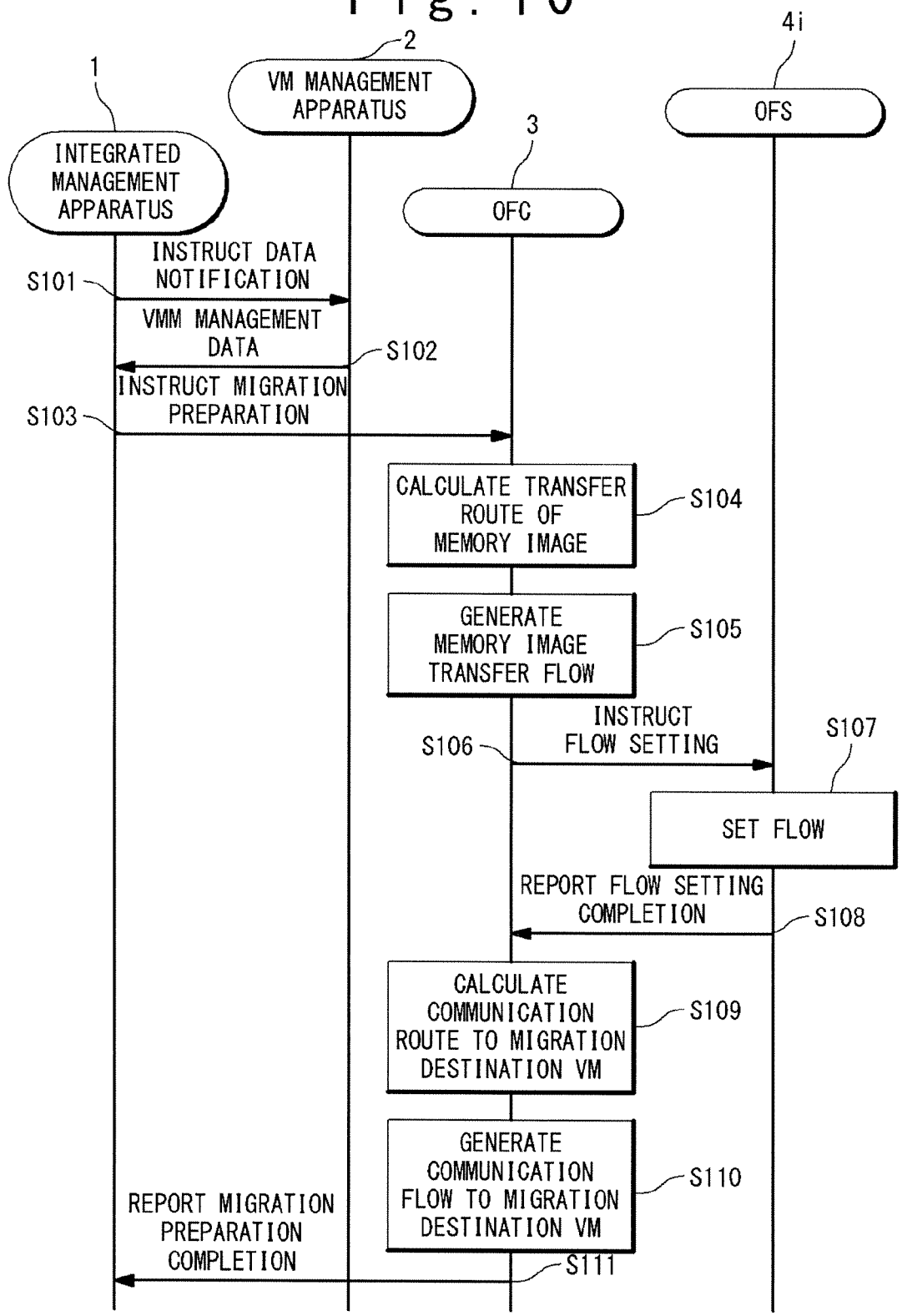
FIG. 10 is a sequence diagram showing preparation processing of migration processing by the virtual machine in the first exemplary embodiment.

Next, referring from FIG. 10 to FIG. 12, a migration operation of the virtual machine according to the first exemplary embodiment of the present invention will be described. FIG. 10 is a sequence diagram showing preparation processing in the first exemplary embodiment in case of the migration processing by the virtual machine.

The manager operates the input unit (not shown) to instruct the integrated management apparatus 1 to control the migration of the virtual machine (hereinafter, to be referred to as VM migration). At this time, a physical server (or a virtual machine monitor) on which the migration virtual machine (hereinafter, to be referred to as migration object VM) operates, the migration object VM, and the physical server (or the virtual machine monitor) as a migration destination are specified. The integrated management apparatus 1 issues a data notification instruction to the VM management apparatus 2 in response to a VM migration instruction (Step S101). Here, the integrated management apparatus 1 issues an instruction to notify data of the virtual machine monitors of the physical servers of the migration source and the migration destination. The VM management apparatus 2 transmits the VMM management data 323 of the physical servers of the migration source and the migration destination to the integrated management apparatus 1 (Step S102). Thus, the integrated management apparatus 1 acquires data of the virtual machine monitor of the migration source (hereinafter, to be referred to as a migration source VMM), data of the migration object VM, data of the virtual machine monitor of the migration destination (hereinafter, to be referred to as migration destination VMM), and the virtual switch of the migration destination (hereinafter, to be referred to as migration destination VSW).

When acquiring the VMM management data 323, the integrated management apparatus 1 issues a migration preparation instruction to the OFC 3 (Step S103). At this time, the integrated management apparatus 1 specifies the migration source VMM, the migration object VM, the migration destination VMM and the migration destination VSW for the OFC 3 based on the VMM management data 323.

When receiving the migration preparation instruction, the OFC 3 first sets a communication route and a flow for the migration of the memory image. The OFC 3 calculates the communication route (memory image transfer route) to transfer the memory image of the migration object VM between the migration source VMM and the migration destination VMM based on the topology data 335 (Step S104). Here, an area in which the memory image of the migration object VM before the migration is stored and an area in which the memory image of the migration object VM after the migration is stored are set as both endpoints and are calculated for the memory image transfer route. Data of the calculated memory image transfer route is stored as the communication route data 336.

The OFC 3 generates a flow (memory image transfer flow) which should be set to each OFS 4i which are on the memory image transfer route calculated at the step S104 (Step S105). The flow (rule 444+action data 445) for the memory image transfer which is generated every OFS 4i is related to each OFS 4i and is registered on the flow table 334. At this time, the setting data 446 of the memory image transfer flow is set to "not set" and "invalid".

The OFC 3 sets the memory image transfer flow to each OFS 4i or node (Steps S106 to S108). In detail, the OFC 3 instructs the corresponding OFS 4i on the communication route to set the memory image transfer flow (Step S106). The OFS 4i which has instructed to set the flow sets the transmitted flow (rule 444+action data 445) to its own flow table 343 (Step S107). The OFS 4i that the setting of the flow is completed reports the flow setting completion to the OFC 3 (Step S108). Here, the memory image transfer flow is set to the nodes on the memory image transfer route in addition to the OFS 4i. Also, when the virtual switch has the configuration corresponding to the open flow technique, the memory image transfer flow is set to the virtual switches on the memory image transfer route. The setting data 446 of the memory image transfer flow which is set to the OFS 4i and the virtual switches is set as "set" and "valid".

Next, the OFC 3 sets the communication route and a flow for access to the migration object VM (hereinafter, to be referred to as migration destination VM) after the VM migration. At first, the OFC 3 calculates the communication route (the communication route for the migration destination VM) (Step S109). In detail, the OFC 3 selects the communication route data 336 of the communication route about the migration object VM from the valid communication route data 336 retained in advance. Here, the valid communication route (valid communication route data 336) shows a communication route that a flow possible to set to the OFS 4i exists. The OFC 3 uses the topology data 335 to correct the communication route by changing one end of the selected communication route from the migration object VM to the virtual switch connected with the migration destination VM and calculates as the communication route for the migration destination VM. Data of the calculated communication route for the migration destination VM is stored as the communication route data 336.

The OFC 3 generates a flow (communication flow for the migration destination VM) to be set to each OFS 4i on the communication route for the migration destination VM calculated at the step S109 (Step S110). The communication flow for the migration destination VM (rule 444+action data 445) generated every OFS 4i is related to each OFS 4i and is registered on the flow table 334. At this time, the setting data 446 of the communication flow for the migration destination VM is set to "not set" and "invalid".

The OFC 3 reports completion of the migration preparation to the integrated management apparatus 1, when generating the communication flow for the migration destination VM (Step S111).

As mentioned above, in the preparation processing in the present exemplary embodiment, the calculation of the transfer route of the memory image of the migration object VM and the setting of a flow for control of the migration, and the calculation of the communication route for access to the migration destination VM and the generation of a flow for the control of the communication are carried out. In the first exemplary embodiment, when the setting of the memory image transfer flow to the OFS 4i and the generation of the communication flow for the migration destination VM are completed, the migration preparation ends.

Figure 11:
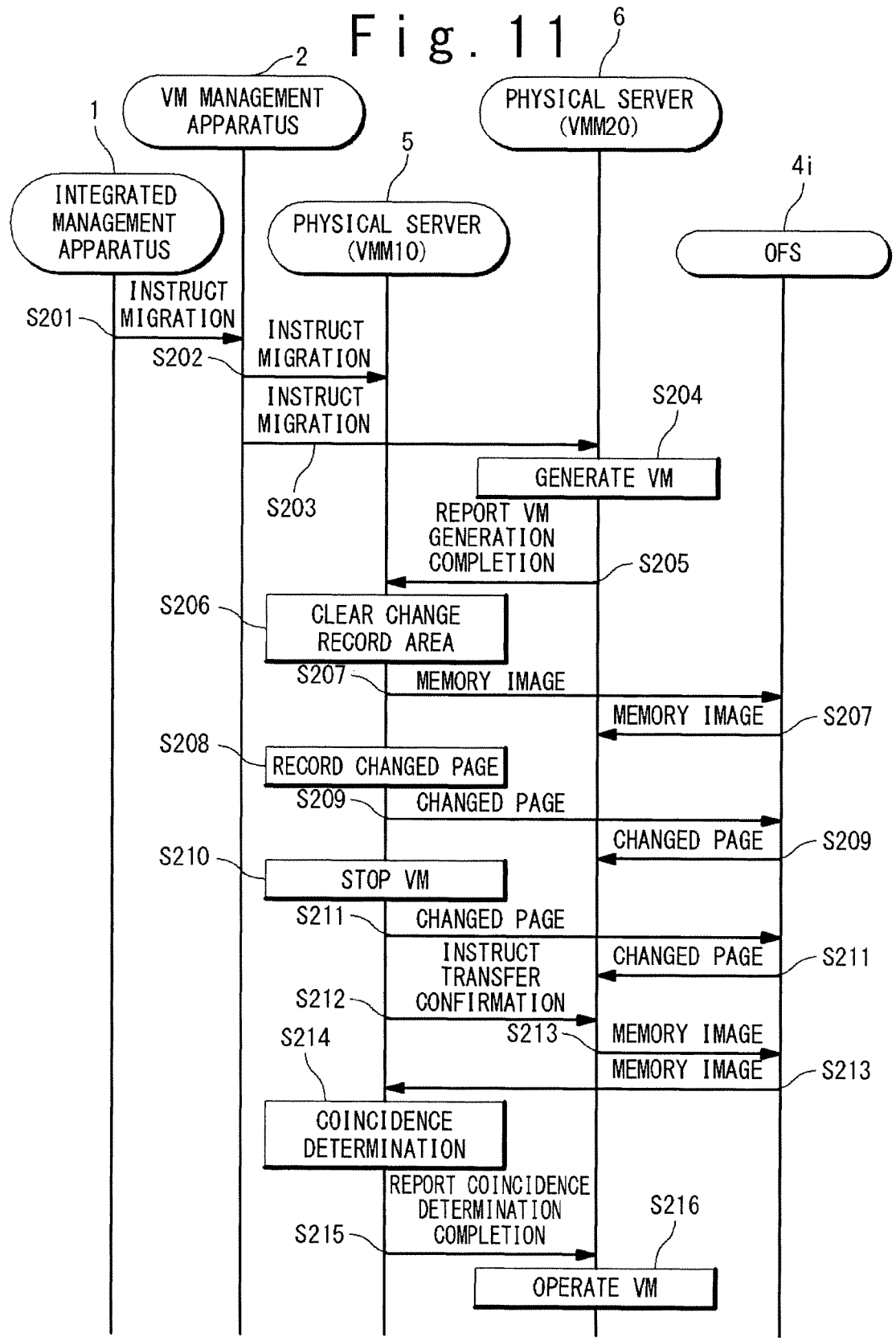
FIG. 11 is a sequence diagram showing memory image transfer processing of the migration processing by the virtual machine in the first and second exemplary embodiments.

FIG. 11 is a sequence diagram showing the memory image transfer processing in case of migration processing according to the first exemplary embodiment of the virtual machine. Referring to FIG. 11, when receiving the migration preparation completion report, the integrated management apparatus 1 issues a migration instruction to the VM management apparatus 2 (Step S201). The VM management apparatus 2 issues the migration instruction to the migration source VMM (VMM 10 in this example) and the migration destination VMM (VMM 20 in this example) which are specified in case of the preparation processing (Steps S202 and S203). At this time, the VM management apparatus 2 notifies the migration object VM to the VMM 10 and 20. It should be noted that in case of the migration instruction at the step S201, the migration source VMM and the migration destination VMM may be specified.

The transfer of the memory image of the virtual machine is carried out between the VMM 10 and 20 in response to the migration instruction from the VM management apparatus 2 (Steps S204 to S212). In detail, the VM specified from the VM management apparatus 2 is generated in the migration destination VMM (hereinafter, the migration destination VMM 20) (Step S204). The migration source VMM (the migration source VMM 10 in this example) transfers the memory image of the migration object VM in response to the VM generation completion report notified from the migration destination VMM 20 (Steps S205 to S207). The migration source VMM 10 transfers the memory image to the VM generated at the step S204. The memory image is transferred through the memory image transfer route set at the steps S104 to S107. At this time, the OFS 4i on the memory image transfer route transfers the memory image according to the memory image transfer flow set at the step S107.

When the access (e.g. the data transfer) to another virtual machine except the migration object VM occurs during the transfer of the memory image, the OFS 4i related to the access executes the action (for example, data relay processing) corresponding to the header data of the reception packet according to the flow set in its own flow table 343. By setting the memory image transfer route so as not to hinder the access to another virtual machine with no relation of the migration, it becomes possible to migrate the migration object VM without hindering the communication with the other virtual machine.

On the other hand, when the access to the migration object VM occurs during the transfer of the memory image (for example, when data for the migration object VM is transferred), the OFS 4i on the communication route to the migration object VM executes the action (for example, the data relay processing) corresponding to the header data of the reception packet according to the flow set to its own flow table 343. Here, because the flow is set under the presumption that the migration object VM is operating on the VMM 10, data for the migration object VM is transferred to the migration object VM on the physical server 5. The migration source VMM 10 records the data destined to the migration object VM in a memory page of the migration object VM.

During the transfer of the memory image, there is a case that the memory page is changed or updated due to the processing of the migration object VM and the data transfer destined the migration object VM. The changed memory page is stored in the change page record area of the storage unit as a copy object (Step S208). It is desirable that the record processing of the change page is carried out until the migration destination VM starts.

When the transfer of all the memory images related to the migration object VM completed, the migration source VMM 10 transfers the changed page to the migration destination VMM 20 through the memory image transfer route set at the steps S104 to S107 (Step S209). However, it is desirable that when the number of changed pages recorded when the transfer of all the memory images related to the migration object VM is completed is equal to or less than a predetermined number, the transfer processing of the changed pages at the step S209 is omitted. Also, during the transfer processing of the changed pages at the step S209, there is a case that the memory page is changed. Therefore, at the step S209, the migration source VMM 10 stores the changed page stored in the changed page record area more in another area, and transfers the changed pages to the migration destination VMM 20 after clearing the changed page record area.

When the transfer (containing the transfer of the changed page) of all the memory images related to the migration object VM completes, the operation of the migration object VM (hereinafter, to be referred to as a migration source VM) operating on the migration source VMM 10 is stopped (Step S210). At this time, the virtual network interface of the migration source VM is also stopped. It should be noted that it is desirable that the migration source VMM 10 stops the migration source VM when the number of changed pages is equal to or less than the predetermined number by repeating the transfer of the changed page and the recording of the changed page at the step S209. After the migration source VM stops, the migration source VMM 10 transfers the changed pages to the migration destination VMM 20 through the memory image transfer route as the steps S104 to S107 (Step S211). Thus, the transfer of the memory image from the migration source VMM 10 to the migration destination VMM completes. The VM (hereinafter, to be referred to as migration destination VM) generated on the migration destination VMM 20 may start to operate, but it is desirable that the matching determination of the memory images in the migration source VM and the migration destination VM is carried out. In detail, the migration source VMM 10 confirms the stop of the migration source VM, and issues a transfer confirmation instruction to the migration destination VMM 20 (Step S212). The migration destination VMM 20 transfers the memory image of the migration destination VM to the migration source VMM 10 through the memory image transfer route set at the steps S104 to S107, in response to the transfer confirmation instruction (Step S213). The migration source VMM 10 determines whether the memory image transferred from the migration destination VMM 20 and the memory image of the migration source VM match to each other (Step S214).

When the matching of the memory images of the migration destination VM and the migration source VM is confirmed at the step S216, a matching confirmation completion report is notified from the migration source VMM 10 to the migration destination VMM 20 (Step S215). The migration destination VMM 20 receives the matching confirmation completion report, and controls the migration destination VM to operate (Step S216). At this time, the virtual network interface of the migration destination VM becomes an operating condition.

On the other hand, when the memory images of the migration destination VM and the migration source VM do not match at the step S216, the transfer processing of the memory page which does not match is carried out (not shown).

As mentioned above, the transfer of the memory image of the VM is carried out by using the route (the memory image transfer route) which is specified by the integrated management apparatus 1. At this time, the access to the migration source VM is carried out according to a flow which has been set to the OFS group 4 before the migration. Therefore, the memory image of the VM can be transferred without stopping communication to the migration source VM. Also, because the memory image transfer route can be set optionally by the integrated management apparatus 1, a route can be select so as not to obstruct communication to another virtual machine. Thus, the transfer of the memory image which does not influence communication to the other virtual machine becomes possible.

Generally, when the physical servers belong to the identical subnet, the data transfer between the physical servers is carried out through a switch of layer 2. However, when the physical servers belong to different subnets, it is necessary to provide the layer 3 switch between the physical servers. On the other hand, in the present invention, the memory image is transferred by using the open flow technique in which the action (e.g. the relay operation) is determined based on a combination of addresses and identifiers from the layer 1 to the layer 4. Therefore, even when the physical servers 5 and 6 belong to the different subnets, the data transfer between the physical servers becomes possible only by changing the setting of the flow.

Figure 12:
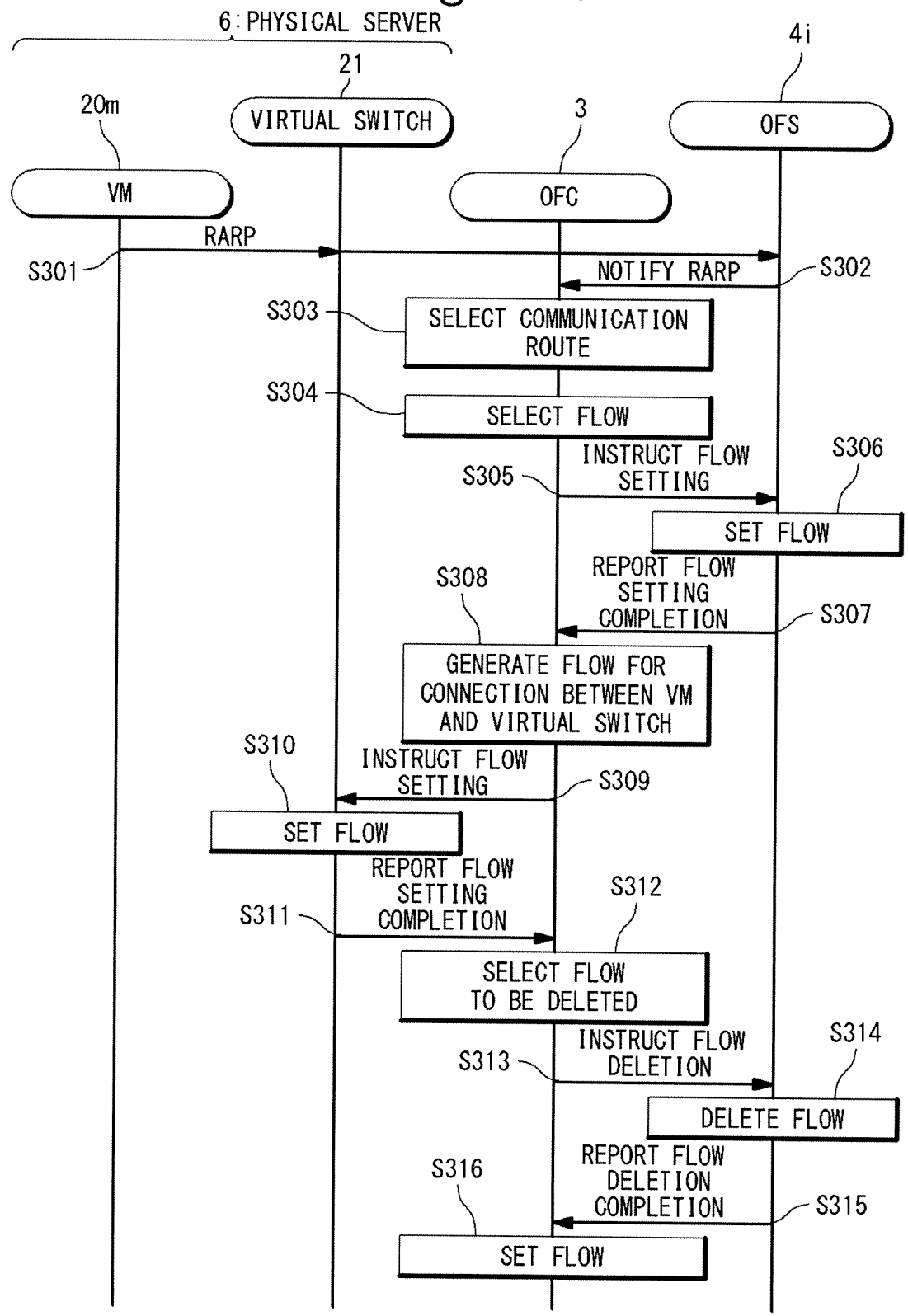
FIG. 12 is a sequence diagram showing access destination changing processing in the migration processing by the virtual machine in the first exemplary embodiment.

FIG. 12 is a sequence diagram showing an access destination switching operation in the migration processing of the virtual machine in the first exemplary embodiment. Here, the access destination switching operation from the migration source VM to the migration destination VM 20m under the condition that the migration destination VM started at the step S218 is referred to the VM 20m will be described. Referring to FIG. 12, when the VM 20m generated on the migration destination VMM 20 become an operating condition, the VM 20m carries out RARP (Reverse Address Resolution Protocol) transmission (Step S301). The RARP is detected by the virtual switch 21 and is transferred to the OFS 4i. The OFS 4i detects the RARP and notifies the detected RARP to the OFC 3 (Step S302). In detail, because the OFS 4i receives packet data through the RARP transmission from the migration destination VM which has become the operating condition, and a flow (rule) which is adaptive for the packet data is not set, the OFS 4i notifies the reception of the first packet to the OFC 3. At this time, the OFS 4i notifies the packet data or the MAC address contained in the packet data to the OFC 3. The OFC 3 selects a communication route corresponding to the notified MAC address as the communication route for the migration destination VM, and selects the communication flow for the migration destination VM set to the switch on the selected communication route for the migration destination VM. Here, the packet data of RARP is transferred from the OFS 4i, and the OFC 3 acquires the MAC address of the VM 20m which is transmitted in RARP.

The OFC 3 selects a communication route (communication route data 336) corresponding to RARP (MAC address) which is notified at the step S302, of the retained valid communication route data 336 (Step S303). Here, the communication route which passes RARP (MAC address) is selected from among the communication routes for the migration destination VM which are calculated at the step S109. Next, the OFC 3 sets the communication flow for the migration destination VM which is generated at the step S110 to the OFS 4i and the node on the selected communication route (Step S304 to S307). In detail, the OFC 3 extracts the node and the OFS 4i on the selected communication route for the migration destination VM from the communication route data 336 and the topology data 335, and selects the communication flow for the migration destination VM corresponding to each (Step S304). Then, the OFC 3 issues a setting instruction of the communication flow for the migration destination VM which is selected every OFS 4i (Step S305). The OFS 4i sets the communication flow for the migration destination VM which is transmitted in response to the setting instruction of the communication flow for the migration destination VM, to its own flow table 343 (Step S306). The OFS 4i ends the setting of the flow and notifies a flow set completion report to the OFC 3 (Step S307). The setting data 446 of the communication flow for the migration destination VM which is set to the OFS 4i is set to "already set" or "valid".

The OFC 3 sets the communication flow for the migration destination VM to the node and the OFS 4i on the communication route for the migration destination V, and generates the flow for connecting between the migration destination VM and the virtual switch 21 by using the topology data 335, when confirming the setting completion (Step S308). The OFC 3 sets the generated flow to the virtual switch 21 (Steps S309 and S310). In detail, the OFC 3 issues a setting instruction of the flow generated at the step S308 to the virtual switch 21 (Step S309). The virtual switch 21 sets the flow transmitted from the OFC 3 in response to the setting instruction of the flow to its own flow table 343 (Step S310). The virtual switch 21 ends the setting of the flow and notifies a flow setting completion report to the OFC 3 (Step S311). The setting data 446 of the communication flow for the migration destination VM set to the virtual switch 21 is set to "already set" and "valid".

When the OFC 3 confirms the setting completion of the flow which connects between the migration destination VM 20m and the virtual switch 21, the OFC 3 selects a flow for the migration source VM and issues a deletion instruction of the flow (Steps S312 and S313). The OFS 4i and the node delete the flow for the migration source VM or set it to an unusable condition (Step S314). The OFS 4i and the node end the deletion of the flow and then notify a flow deletion completion report to the OFC 3 (Step S315). When confirming the deletion of the flow in the node and the OFS 4i on the communication route for the migration source VM, the OFC 3 sets the communication flow for the migration destination VM as a current use flow, and sets the communication flow for the migration source VM as an unused flow (Step S316). Here, data showing "use" or "unuse" (valid or invalid) is set in the setting data 446 corresponding to each flow (rule 444+action data 445). At this time, the unused communication flow for the migration source VM may be deleted from the flow table 334. However, by setting the use or unuse (valid or invalid) of the flow through the change of the setting data 446 without deleting the unused flow, the flow can be set again without generating the flow when the migrated virtual machine is returned to the original physical server or VMM.

Thereinafter, the communication for the migration destination VM 20*m* is performed to the VMM 20 operating on the physical server 6 (VMM 20) according to the communication flow for the migration destination VM which is set to each OFS 4*i*.

As mentioned above, according to the migration method of the present invention, the migration of the virtual machine becomes possible without interrupting communication with the virtual machine. In the present exemplary embodiment, the migration between the different physical servers has been described as an example but the migration in the identical physical server can be realized in the similar method.

Also, according to the present invention, the setting for the transfer of a memory image and the setting for the communication with the migration destination VM can be carried out by the integrated management apparatus 1. That is, it is desirable that the migration of the virtual machine can be controlled by one managing section. Therefore, according to the present invention, a computer system which is separately managed by a network manager and an IT manager become able to be managed and operated by one managing section.

It should be noted that when the virtual switch 21 is the virtual switch which carries out a usual switching (layer 2) operation, the processing of steps S308 to S311 is omitted.

Second Exemplary Embodiment

Next, referring to FIG. 11, FIG. 13 and FIG. 14, the migration method of a virtual machine in the computer system according to the second exemplary embodiment of the present invention will be described. Because the configuration of the computer in the second exemplary embodiment is same as the first exemplary embodiment, the description is omitted. The operation which is different from that of the first exemplary embodiment will be described. Also, the same operation as that of the first exemplary embodiment will be described by adding the same numerals.

In the migration method of the virtual machine in the second exemplary embodiment, the communication flow for the migration destination VM is set to the OFS 4*i* at the stage of the migration preparation processing. Thus, the packet data for the migration object VM is duplicated and is transferred to both of the migration source VM and the migration destination VM. In the first exemplary embodiment, because the communication flow for the migration destination VM is set after the transfer of the memory image of the migration object VM, there is a case that a packet loss occurs during a period from stop of the migration object VM to the setting of the of the communication flow for the migration destination VM (switching of the access destination to the migration object VM). However, in the second exemplary embodiment, because both of a flow for the migration source VM and a flow for the migration destination VM are set at the stage of the migration preparation, the occurrence of the packet loss can be prevented in case of switching the access destination to the migration destination VM.

Figure 13:
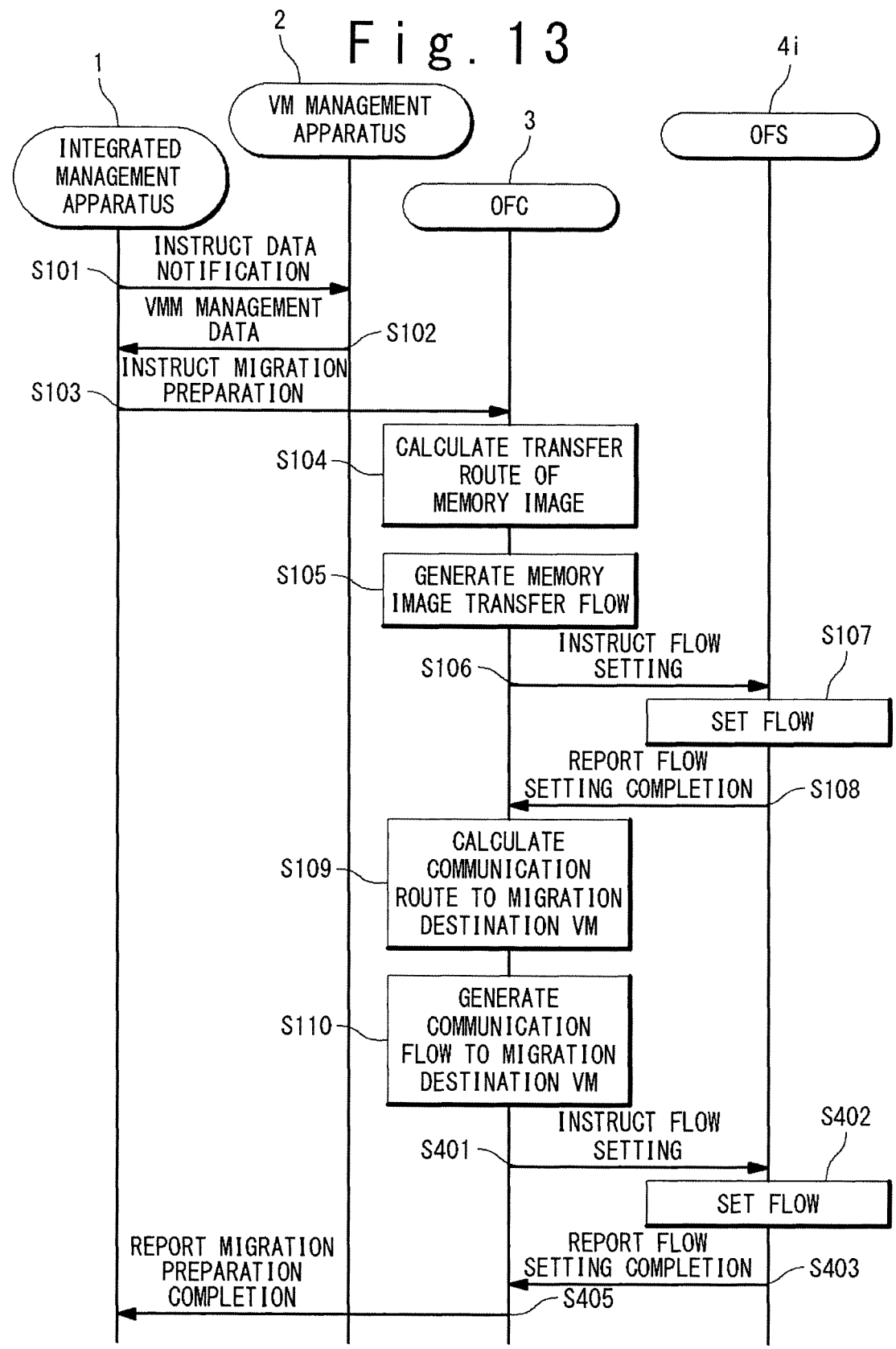
FIG. 13 is a sequence diagram showing the preparation processing in the migration processing by the virtual machine in the second exemplary embodiment.

FIG. 13 is a sequence diagram showing the preparation processing in the second exemplary embodiment in case of the migration processing by the virtual machine. Referring to FIG. 13, in the preparation processing of the second exemplary embodiment, the processing of the steps S101 to S110 is first carried out like the first exemplary embodiment. In the second exemplary embodiment, the OFC 3 sets the communication flow for the migration destination VM to each OFS 4*i* in the migration preparation step (Steps S401 to S403). In detail, the OFC 3 extracts the node and the OFS 4*i* on the communication route for the migration destination VM which is selected based on the communication route data 336 and the topology data 335, and selects the communication flow for the corresponding migration destination VM. Then, the OFC 3 issues a setting instruction of a communication flow for the migration destination VM which is selected for every OFS 4*i* (Step S401). The OFS 4*i* sets the transmitted communication flow for the migration destination VM to its own flow table 343 in response to the setting instruction of the communication flow for the migration destination VM (Step S402). When the setting of the flow is ended, the OFS 4*i* notifies a flow setting completion report to the OFC 3 (Step S403). The setting data 446 of the communication flow for the migration destination VM which is set to the OFS 4*i* is set to the "already set" or "valid" condition.

When the setting of the communication flow for the migration destination VM completes, the OFC 3 notifies the completion of the migration preparation to the integrated management apparatus 1 (Step S405).

As mentioned above, in the preparation processing in the present exemplary embodiment, the setting of a transfer route of the memory image of the migration object VM and a flow to control the migration, and the setting of a communication route for the access to the migration destination VM and a flow to control the communication are carried out. In the second exemplary embodiment, when the setting of the memory image transfer flow and a communication flow for the migration destination VM to the OFS 4*i* is ended, the migration preparation ends.

Referring to FIG. 11, in the image transfer processing of the second exemplary embodiment, the processing (the transfer processing of the memory image) at the steps S201 to S207 is first carried out, like the first exemplary embodiment. When the access to any of the other virtual machines except for the migration object VM (e.g. the data transfer) occurs during the transfer of the memory image, the OFS 4*i* related to the access executes an action (for example, the relay processing of data) corresponding to the header data of the reception packet according to the flow set to its own flow table 343. In this case, the migration object VM can be transferred without hindering communication with the other virtual machine, by setting the memory image transfer route so as not to hinder the access to the other virtual machine with no relation to the migration.

On the other hand, when the access to the migration object VM occurs during the transfer of the memory image (for example, when the data for the migration object VM is transferred), the OFS 4*i* on the communication route to the migration object VM executes an action (for example, the relay processing of data) corresponding to the header data of the reception packet according to the flow set to its own flow table 343. In the present exemplary embodiment, because the flow is set under the presumption that the migration object VM operates on the VMM 10 or the VMM 20, the data for the migration object VM is copied and is transferred to both of the migration object VM (the migration source VM) on the physical server 5 and the migration destination VM on the physical server 6. The migration source VMM 10 records the data transferred for the migration object VM in the memory page of the migration object VM. At this time, the data transferred for the migration object VM is stored in the memory page of the migration destination VM in the migration destination VMM 20.

During the transfer of the memory image, there is a case that the memory page is changed based on the data transferred for the migration object VM by the migration object VM in the process processing. The changed memory page is stored in the changed page record area of the storage unit as a copy object (Step S208). It is desirable that the record processing of the changed page is carried out until the migration destination VM starts the operation.

Since then, the processing like the first exemplary embodiment is carried out from the record of the changed page (Step S208) to the operation of the migration destination VM (Step S216).

As mentioned above, in the migration method in the second exemplary embodiment, the transfer of the memory image of the VM is carried out by using a route specified by the integrated management apparatus (the memory image transfer route), like the first exemplary embodiment. At this time, because the access to the migration source VM is carried out according to a flow set to the OFS group 4 before the migration, the memory image of the VM can be transferred to the migration source VM without stopping the communication. Also, because the memory image transfer route can be set optionally by the integrated management apparatus 1, a route can be selected so as not to hinder the communication to another virtual machine. With this, the transfer of the memory image which does not influence the communication to the other virtual machines becomes possible.

Figure 14:
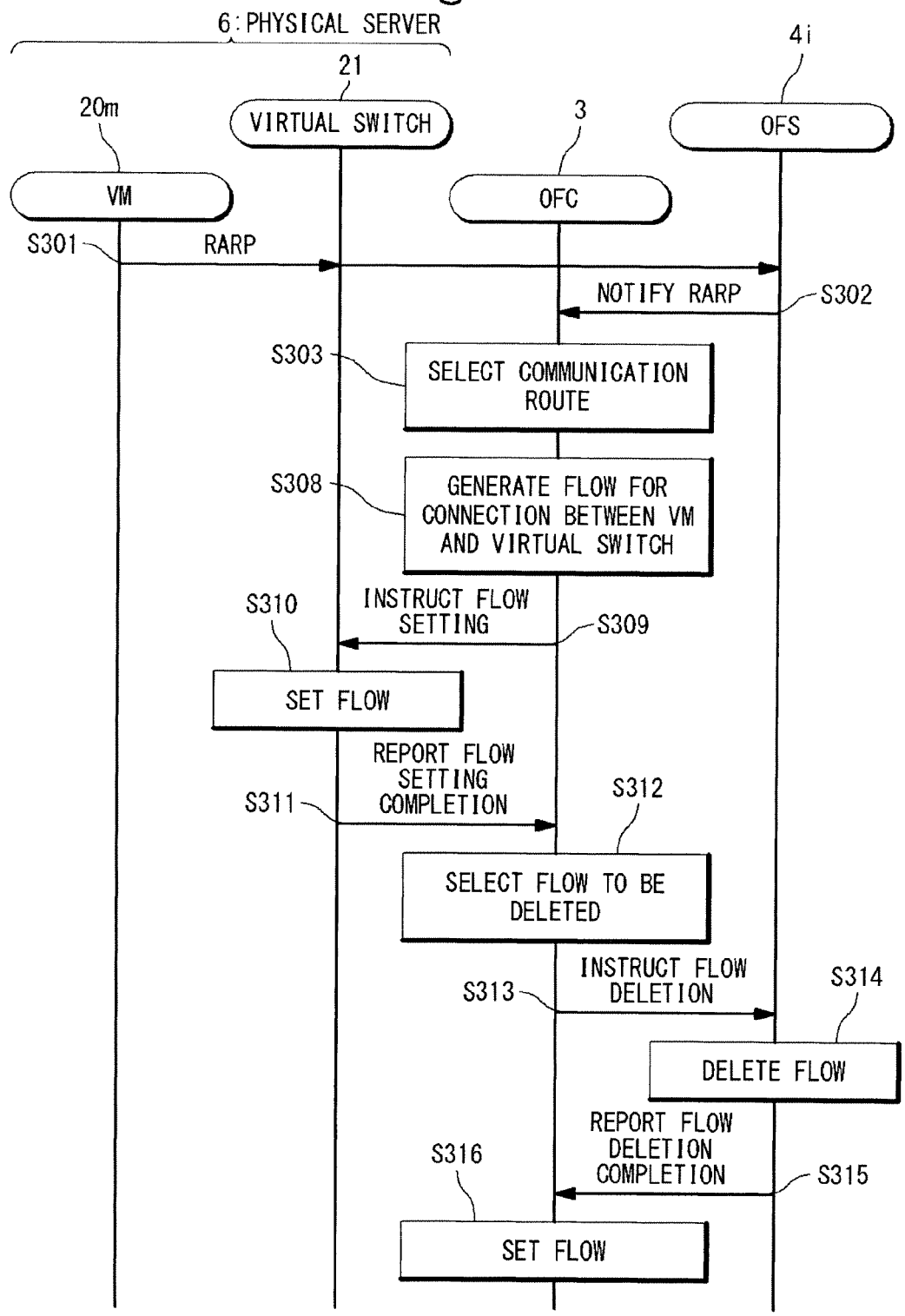
FIG. 14 is a sequence diagram showing access destination changing processing in the migration processing by the virtual machine in the second exemplary embodiment.

FIG. 14 is a sequence diagram showing the access destination switching processing in case of the migration processing of the virtual machine in the second exemplary embodiment. Referring to FIG. 14, in the access destination switching processing of the second exemplary embodiment, the communication route selecting processing of the steps S301 to S301 is first carried out like the first exemplary embodiment. Next, the setting processing (Steps S304 to S307) of a communication flow for the migration destination VM to the OFS 4*i* is carried out in case of migration preparation processing, as carried out in the first exemplary embodiment. Therefore, the description is omitted.

Since then, the processing from the generation processing of a flow for connecting between the migration destination VM and the virtual switch 21 (Step S308) to the flow setting processing (Step S316) is carried out, like the first exemplary embodiment.

As mentioned above, in the second exemplary embodiment, in the preparation processing, both of a flow for the migration source VM and a flow for the migration destination VM are set. Therefore, the data transferred for the migration object VM reaches the migration destination VM without being discarded during a period from the stop of the migration source VM at the step S213 to the flow setting at the step S316. In this way, in the computer system of the present exemplary embodiment, the packet loss can be prevented in the migration of the virtual machine. Also, the migration of the virtual machine is never made conscious from the side of external network 8.

Moreover, in the present exemplary embodiment, a flow (communication flow for the migration destination VM) corresponding to a new communication route (communication route for the migration destination VM) after the migration of VM is set at the step of the migration preparation processing. Therefore, a time required to establish the new communication route in the present exemplary embodiment is shortened, as compared with the first exemplary embodiment in which the new communication route is established after detection of the migration of VM.

Third Exemplary Embodiment

Figure 15:
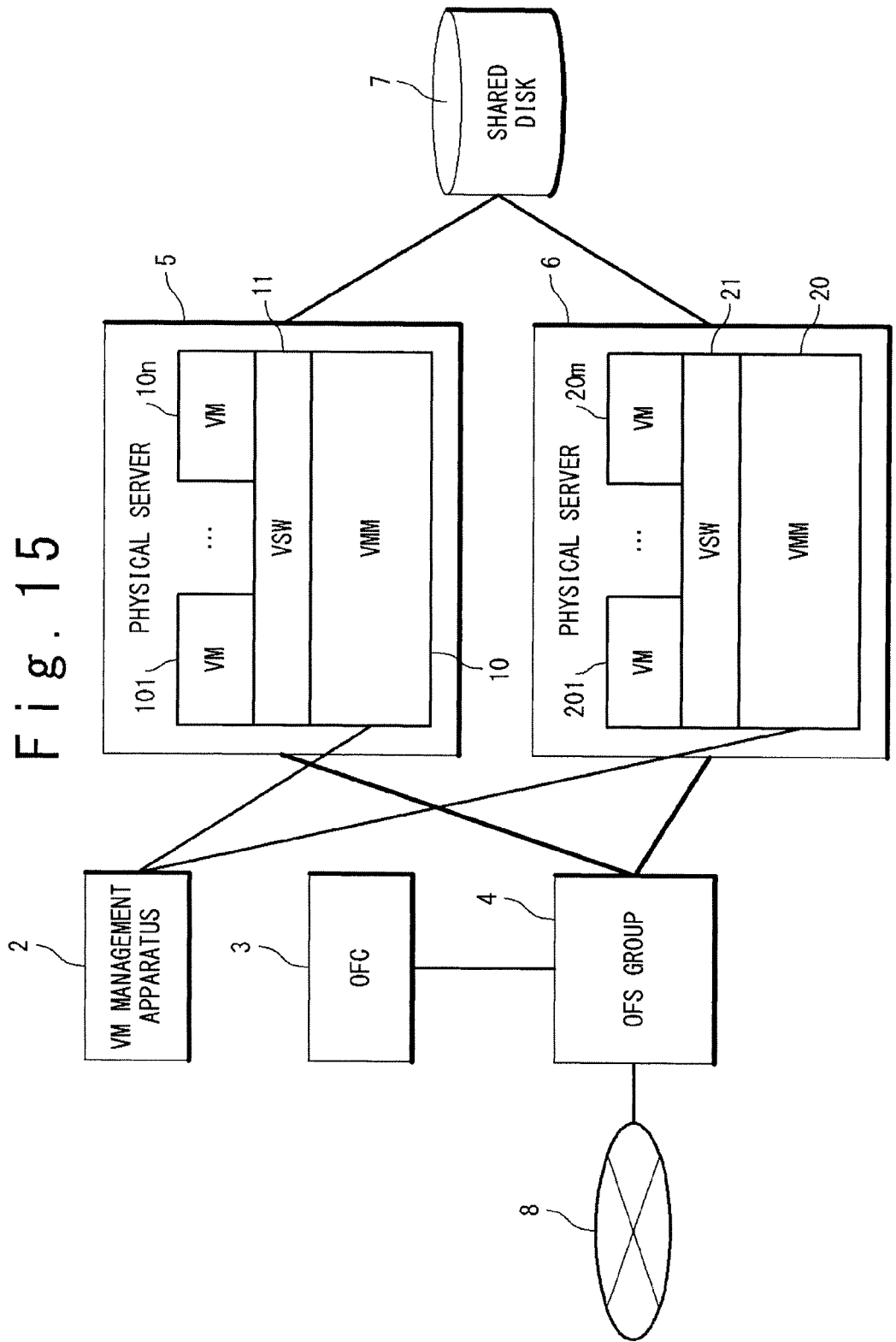
FIG. 15 is a diagram showing a configuration of the computer system according to a third exemplary embodiment of the present invention.

Next, referring to FIG. 15 and FIG. 16, the migration method of the virtual machine in the computer system according to a third exemplary embodiment of the present invention will be described. FIG. 15 is a diagram showing a configuration of the computer system according to the third exemplary embodiment of the present invention. Referring to FIG. 15, the computer system in the third exemplary embodiment has a configuration in which the integrated management apparatus 1 is excluded from the computer system in the first exemplary embodiment. Below, the operation which is different from the first exemplary embodiment will be described. Also, the same operation as in the first exemplary embodiment will be described by assigning the same reference numerals.

In the migration method of the virtual machine in the third exemplary embodiment, the setting for the VM migration is carried out only to the VM management apparatus 2, and the OFC 3 detects a migration destination of the virtual machine and carries out the flow setting to change the data transfer destination. Therefore, in the third exemplary embodiment, the control of the VM management apparatus 2 and the OFC 3 by the integrated management apparatus 1 is not carried out. That is, in the third exemplary embodiment, the cooperation between the VM management apparatus 2 and the OFC 3 is not carried out. Therefore, in the migration method of the virtual machine in the third exemplary embodiment, the migration preparation processing is not carried out, unlike the first and second exemplary embodiments.

Before the transfer processing of the memory image, the manager operates the input unit (not shown) and instructs the VM management apparatus 2 to carry out the VM migration. At this time, the physical server on which the migration object VM operates (or the virtual machine monitor), the migration object VM and the physical server as the migration destination (or the virtual machine monitor) are specified. Unlike the first and second exemplary embodiments, the VM management apparatus 2 issues the migration instruction to the VMMs 10 and 20 in response to the operation by the manager (the instruction). Since then, like the conventional technology, the transfer processing of the memory image of the migration object VM is carried out. That is, the generation processing of VM in the migration destination VMM and the transfer processing of the memory image of the migration object VM to the migration destination VM are carried out. At this time, the record of the memory page changed during the transfer, the change, and so on are carried out by the same method as the conventional technique. When the transfer of the memory image is completed, the matching determination of the memory images of the migration source VM and the migration destination VM is carried out if the number of memory pages changed during the transfer of the memory image is equal to or less than a predetermined number. When matching to each other, the migration source VM stops and the migration destination VM becomes an operating condition. On the other hand, when the numbers of changed memory pages is more than the predetermined number, the re-transmission of the changed page is carried out until the number of changed pages becomes equal to or less than the predetermined number.

FIG. 16 is a sequence diagram showing the access destination switching processing in case of migration processing of the virtual machine in the third exemplary embodiment. Here, the access destination switching operation from the migration source VM to the migration destination VM 20*m* will be described, supposing that the operating migration destination VM is the VM 20*m*. Referring to FIG. 16, when the VM 20*m* generated on the migration destination VMM 20 enters an operating condition, the VM 20*m* first carries out RARP (Reverse Address Resolution Protocol) transmission (Step S501). The RARP is detected by the virtual switch 21 and is transferred to the OFS 4*i*. The OFS 4*i* detects the RARP and notifies the detected RARP to the OFC 3 (Step S502). In detail, the OFS 4*i* receives the packet data through the RARP transmission from the migration destination VM entered the operating condition and notifies the reception of the first packet to the OFC 3 because a flow (rule) which fits with the packet data is not set. At this time, the OFS 4*i* notifies the MAC address contained in the packet data or the packet data to the OFC 3. The OFC 3 selects the communication route corresponding to the notified MAC address as a communication route for the migration destination VM, and generates a communication flow for the migration destination VM. Here, the packet data is transferred from the OFS 4*i* through the RARP transmission and the MAC address of the VM 20*m* transmitted by the RARP transmission is acquired by the OFC 3.

The OFC 3 detects the change of a connection destination of the virtual machine (migration destination VM 20*m*) which starts the operation based on a RARP notice from the virtual switch 21 (or the OFS 4*i*) (Step S503). In detail, the OFC 3 searches (extracts) the communication route (communication route data 336) corresponding to the RARP notice notified at the step S502 from the retained valid communication route data 336. Specifically, the OFC 3 extracts the communication route (communication route data 336) having the MAC address contained in the notified RARP as an endpoint. Then, the OFC 3 detects that the connection destination of VM (or the physical server) as the endpoint on the searched (extracted) communication route is different from the virtual switch 21 (or the OFS 4*i*) which receives the RARP transmission. Thus, the OFC 3 can detect that the connection destination of the virtual machine (the migration destination VM 20*m*) in the operating condition has been changed. It should be noted that when the physical servers 5 and 6 are connected with the identical OFS 4*i*, the port with which the OFS 4*i* is connected is different every physical server. Therefore, by detecting that the connection destination port of the physical server as an endpoint on the searched (extracted) communication route in the OFC 3 and the connection destination port of the switch which receives the RARP transmission are different, the migration of the virtual machine can be detected.

The OFC 3 reproduces the communication route related to the migration source VM in the migration destination VM 20*m*, when detecting the change of the connection destination of the migration destination VM 20*m* (Steps S504 to S516). In detail, the OFC 3 calculates a communication route (communication route for the migration destination VM) between the endpoint on the side which is different from the VM on the communication route searched at the step S503 and the endpoint which detects the RARP transmission at the step S502, by using the topology data 335 (Step S504). The data of the calculated communication route for the migration destination VM is stored as the communication route data 336. The OFC 3 generates a flow (the communication flow for the migration destination VM) to be set to each OFS 4*i* on the communication route for the migration destination VM calculated at the step S504 (Step S505). The communication flow (rule 444+action data 445) for the migration destination VM is generated for every OFS 4*i* and is related to each OFS 4*i* and stored on the flow table 334. At this time, the setting data 446 of the communication flow for the migration destination VM is set to the "not-set" and "invalid" condition.

Next, the OFC 3 sets the communication flow for the migration destination VM generated at the step S505 to the virtual switch 21 and the OFS 4*i* on the communication route calculated at the step S504 (Steps S506 to S511). In detail, the OFC 3 extracts the virtual switch 21 and the OFS 4*i* on the communication route for the migration destination VM calculated from the communication route data 336 and the topology data 335, and issues a setting instruction for the communication flow for the migration destination VM corresponding to the OFS 4*i* and the virtual switch 21 (Steps S506 and S507). The OFS 4*i* and the virtual switch 21 set the transmitted communication flow for the migration destination VM to its own flow table 343 in response to the setting instruction of the communication flow for the migration destination VM (Steps S508 and S510). Then, the OFS 4*i* ends the setting of the flow, and the virtual switch 21 notifies a flow setting completion report to the OFC 3 (Steps S509 and S511). The setting data 446 of the communication flow for the migration destination VM which is set to the OFS 4*i* and the virtual switch 21 is set to the "already set" and "valid" condition.

When confirming the setting completion of the communication flow for the migration destination VM to the OFS 4*i* and the virtual switch 21, the OFC 3 selects a flow for the migration source VM and issues a deletion instruction of the flow (Steps S512 and S513). The OFS 4*i* and the virtual switch 21 set deletion of the flow for the migration source VM and the use impossible condition (Step S514). When the deletion of the flow is ended, the OFS 4*i* and the virtual switch 21 notify a flow deletion completion report to the OFC 3 (Step S515). When confirming the deletion of the flow for the migration source VM in the OFS 4*i* and the node on the communication route for the migration source VM, the OFC 3 sets the communication flow for the migration destination VM as a current use flow and sets a communication flow for the migration source VM as the flow which is not used (Step S516). Here, the data showing a used or unused condition is set to the setting data 446 corresponding to each flow (rule 444+action data 445). At this time, the communication flow for the migration source VM which is not used, may be deleted from the flow table 334. However, by setting the use or non-use of the flow through the change of the setting data 446 without deleting the not-used flow, it is possible to set the flow without generating the flow once again when the migration virtual machine is migrated to the original physical server or VMM.

As mentioned above, in the third exemplary embodiment, it is not possible to control the transfer route of the memory page by the OFC 3. However, by setting the migration object VM and the migration destination VMM to only the VM management apparatus 2, it is possible to control the migration of the virtual machine and the change of the access destination of the migration destination VM. That is, even in the computer system of the third exemplary embodiment, the VM migration can be controlled integratedly by one managing section.

In the third exemplary embodiment, the calculation of the communication route for the migration destination VM and the generation of a flow are carried out according to the RARP transmission. However, the calculation of the communication route and the generation of the flow may be carried out according to the communication situation between the VMMs. In this case, the OFC 3 monitors the communication between the VMMs, calculates the communication route for the migration destination VM which becomes valid in response to the transfer start of the memory page, and generates the flow (rule 444+action data 445) to be set to each OFS 4*i* and the virtual switch 21. Thus, the processing of the steps S501 to S511 shown in FIG. 16 can be reduced. Also, because the time period from the stop of the migration source VM to the setting of the communication flow for the migration destination VM can be reduced, a quantity of the packet loss which occurs during the above time period can be reduced.

Fourth Exemplary Embodiment

FIG. 17 is a diagram showing the configuration of the computer system in a fourth exemplary embodiment. The computer system in the fourth exemplary embodiment is further provided with a load balancer 9 provided between the external network 8 and the OFS group 4 in addition to the computer system in the first and second exemplary embodiments.

The load balancer 9 carries out load distribution of the VMM 101 to 10n and 201 to 20m in the physical servers 5 and 6. In the computer system in the fourth exemplary embodiment, the VM migration is carried out like any of the first to third exemplary embodiments. However, in the fourth exemplary embodiment, the integrated management apparatus 1 or the VM management apparatus 2 issues an instruction to the load balancer 9 such that the processing (access) of the migration source VM does not generate at the step that the execution of the VM migration is instructed. In this way, because the recording and transfer of the changed page is omitted and a processing quantity is reduced, the time of the VM migration can be reduced. Also, during the transfer of the memory page of the migration object VM, the load to the migration source VM reduces.

The exemplary embodiments of the present invention have been described in detail. However, the configuration is not limited to those of the above exemplary embodiments and modifications in a range which does not deviate from the scope of the present invention are contained in the present invention. For example, in the VM migration method in the first, second, and fourth exemplary embodiments, QoS (Quality of Service) of the memory image transfer route may be set to have a higher priority than other communications. Thus, the time required for the VM migration may be reduced. Or, the QoS of the memory image transfer route may be set to have a lower priority than the other communications. In this case, the influence of the VM migration to the other communications can be reduced. Moreover, of the preliminary preparation (migration preparation processing) of the VM migration in the first, second, and fourth exemplary embodiments, the calculation of the communication route for the migration destination VM and the generation of the communication flow for the migration destination VM may be carried out concurrently with the transfer of the memory image. Thus, the migration preparation processing time from the side of the network can be reduced and the processing time of the VM migration is also reduced.

The OFC 3 carries out "the selection of the communication route for the migration destination VM" and "the confirmation of the change of the migration destination of VM" by using the MAC address which is notified by the RARP transmission. However, the present invention is not limited to this. For example, the OFS 4i receives the packet data transmitted by the migration destination VM entering an operating condition after the migration, and notifies the reception of the first packet to the OFC 3 because a flow (rule) which fits with the received packet data is not set. At this time, the OFS 4i notifies the MAC address of the packet data to the OFC 3. The OFC 3 selects the communication route corresponding to the notified MAC address as the communication route for the migration destination VM and generates the communication flow for the migration destination VM. Or, in the same way, the OFC 3 extracts the communication route having as an endpoint, the MAC address acquired by the notice of the first packet, and detects that the connection destination of VM as the endpoint on the communication route and a switch which receives the packet data are different. Thus, the change of the connection destination of the reception may be confirmed.

This patent application claims a priority based on Japan Patent Application No. JP 2009-222857. The disclosure thereof is incorporated therein by reference.

The invention claimed is:

1. A computer system, comprising:
a virtual machine (VM) management apparatus configured to instruct a migration of a virtual machine operating on a physical server to a virtual machine monitor which manages said virtual machine and a migration destination virtual machine monitor;
a controller configured to generate a communication flow for a migration destination VM as a communication flow controlling a communication for said migration destination virtual machine monitor;
a switch configured to notify first data contained in packet data to said controller when the packet data from the virtual machine that the migration has completed does not fit with a rule shown by a flow set to said switch; and
an integrated management apparatus to instruct said controller to generate the communication flow when the integrated management apparatus acquires data of the virtual machine monitor of the migration destination VM,
wherein said switch transfers the packet data for said virtual machine which follows said rule shown by the communication flow for said migration destination VM, to the migration destination virtual machine based on an action shown by the communication flow for said migration destination VM.

2. The computer system according to claim 1, wherein said controller sets a memory image transfer flow corresponding to a transfer route of a memory image of said virtual machine of a migration object to said switch, and
wherein said switch transfers the memory image which follows the rule shown by the memory image transfer flow to said migration destination virtual machine based on the action shown by the memory image transfer flow.

3. The computer system according to claim 2,
wherein the integrated management apparatus is configured to specify a migration object virtual machine, a migration source virtual machine monitor, and said migration destination virtual machine monitor, and instruct said VM management apparatus and said controller to carry out the migration of said virtual machine,
wherein said controller calculates a transfer route of the memory image of said migration object virtual machine in response to the instruction, and generates the memory image transfer flow to be set to a switch on said transfer route, and
wherein said VM management apparatus transfers the memory image of said migration object virtual machine to a virtual machine generated on said migration destination virtual machine monitor in response to the instruction.

4. The computer system according to claim 2, wherein said controller sets a communication route, specifies the switch on a set communication route based on topology data, and stores the rule and an action corresponding to the specified switch on a flow table as a flow to the specified switch.

5. The computer system according to claim 1,
wherein the integrated management apparatus is configured to specify a migration object virtual machine, a migration source of the virtual machine monitor, and said migration destination virtual machine monitor, and issues an instruction of the migration of the virtual machine to said controller, wherein said controller calculates a communication route for said migration destination virtual machine in response to said instruction and generates the communication flow for said migration destination VM to be set to a switch on said communication route.

6. The computer system according to claim 5, wherein said controller selects the communication route for said migration object virtual machine, changes one of endpoints of the communication route to said migration destination virtual machine from said migration object virtual machine, and sets the communication route for said migration destination virtual machine.

7. The computer system according to claim 6, wherein said controller selects the communication route for said migration destination virtual machine from retained communication routes based on a notice from the switch which receives RARP (Reverse Address Resolution Protocol) from an operating virtual machine, selects the communication flow for said migration destination VM to be set to said switch on the selected communication route, from the retained flows, and sets the selected flow to said switch on the selected communication route.

8. The computer system according to claim 1, wherein said controller detects a change of a connection destination of said virtual machine based on a difference between a switch which detects RARP (Reverse Address Resolution Protocol) transmission by the operating virtual machine and an endpoint in a communication route to have extracted from retained communication routes.

9. The computer system according to claim 8, wherein said controller extracts the communication route from the retained communication routes based on the MAC address contained in the RARP transmission by the operating virtual machine, calculates the communication route between the endpoint on a side different from the virtual machine in the extracted communication route and the endpoint which detects the RARP transmission as the communication route for the migration destination virtual machine, and generates the communication flow for said migration destination VM to be set to said switch on the communication route.

10. The computer system according to claim 1, wherein said controller sets a communication route, specifies the switch on the set communication route based on topology data, and stores the rule and an action corresponding to the specified switch on a flow table as the flow to the specified switch.

11. The computer system according to claim 1, wherein the rule is prescribed based on a combination of an address of a layer 1 to a layer 4 and an identifier of an OSI (Open Systems Interconnection) reference model which is contained in header data of the packet data based on TCP/IP (Transmission Control Protocol/Internet Protocol).

12. A migration method of a virtual machine, said method comprising:
instructing a migration of a virtual machine operating on a physical server from a virtual machine (VM) management apparatus to a virtual machine monitor which manages the virtual machine and a migration destination virtual machine monitor;
generating a communication flow for the migration destination VM by a controller as a flow for control of a communication for said migration destination virtual machine monitor;
notifying first data contained in packet data to said controller, when the packet data received from the virtual machine which has completed the migration does not fit with a rule shown in a flow set to a switch;
instructing said controller, by an integrated management apparatus, to generate the communication flow when the integrated management apparatus acquires data of the virtual machine monitor of the migration destination VM,
said switch transferring the packet data for said virtual machine which follows the rule shown by the communication flow for said migration destination VM to said migration destination virtual machine based on an action shown in the communication flow for said migration destination VM.

13. The migration method according to claim 12, further comprising:
setting the memory image transfer flow corresponding to a memory image transfer route of a migration object virtual machine to said switch by said controller; and
transferring the memory image which follows the rule shown by a flow for said memory image transfer to said migration destination virtual machine based on the action shown by the flow for the said memory image transfer by said switch.

14. The migration method according to claim 13, further comprising:
specifying by said integrated management apparatus, said migration object virtual machine, a migration source virtual machine monitor, and said migration destination virtual machine monitor, and instructing the migration of the virtual machine to said VM management apparatus and said controller;
calculating the transfer route of the memory image of the specified migration object virtual machine by said controller in response to the instruction;
generating a transfer flow of the memory image set to a switch on the transfer route by said controller; and
transferring the memory image of the specified migration object virtual machine to the virtual machine generated on said migration destination virtual machine monitor by said VM management apparatus in response to the instruction.

15. The migration method according to claim 12, further comprising:
specifying a migration object virtual machine, a migration source virtual machine monitor, and the migration destination virtual machine monitor and instructing the migration of the virtual machine to the said controller by said integrated management apparatus;
calculating a communication route for the migration destination virtual machine by said controller in response to the instruction; and
generating the communication flow for said migration destination VM set to the switch on the communication route by said controller.

16. The migration method according to claim 15, wherein said calculating the communication route for said migration destination virtual machine comprises:
selecting the communication route of the migration object virtual machine by said controller; and
changing one of endpoints of the selected communication route from the migration object virtual machine to the migration destination virtual machine by said controller to set the communication route for the migration destination virtual machine.

17. The migration method according to claim 16, further comprising:
- selecting the communication route for the migration destination virtual machine from retained communication routes based on notices from the switch which receives RARP (Reverse Address Resolution Protocol) transmission from the operating virtual machine by said controller;
- selecting a communication flow for the migration destination VM set to the switch on the selected communication route from the retained flows by said controller; and
- setting the communication flow for the selected migration destination VM to the switch on the selected communication route by said controller.

18. The migration method according to claim 12, further comprising:
- detecting a change of a connection destination of said virtual machine based on a difference between the switch which detects RARP (Reverse Address Resolution Protocol) transmission by the operating virtual machine and an endpoint of a communication route extracted from the retained communication route by said controller.

19. The migration method according to claim 18, further comprising:
- extracting by said controller, the communication route from a retained communication routes based on the MAC address contained in the RARP transmission by the operating virtual machine;
- calculating the communication route between the endpoint on a side different from the virtual machine in the extracted communication route by said controller and the endpoint which detects the RARP transmission as the communication route for the migration destination virtual machine; and
- generating the communication flow for said migration destination VM set to the switch on said communication route by said controller.

20. The migration method according to claim 12, wherein the rule is prescribed by a combination of an address of from layer 1 to layer 4 and an identifier of the OSI (Open Systems Interconnection) reference model contained in header data of the packet data following TCP/IP (Transmission Control Protocol/Internet Protocol).

* * * * *